United States Patent
Pantev

(10) Patent No.: US 10,047,526 B2
(45) Date of Patent: *Aug. 14, 2018

(54) SELF-LOCKING MECHANISM AND PANELING

(71) Applicant: Gueorgui Pantev, Toronto (CA)

(72) Inventor: Gueorgui Pantev, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/045,901

(22) Filed: Feb. 17, 2016

(65) Prior Publication Data
US 2016/0160507 A1  Jun. 9, 2016

Related U.S. Application Data

(63) Continuation of application No. 14/338,958, filed on Jul. 23, 2014, now Pat. No. 9,297,169.
(Continued)

(51) Int. Cl.
*E04B 2/00* (2006.01)
*E04F 15/02* (2006.01)
(Continued)

(52) U.S. Cl.
CPC .... *E04F 15/02005* (2013.01); *E04F 13/0889* (2013.01); *E04F 13/0894* (2013.01);
(Continued)

(58) Field of Classification Search
CPC ................ E04F 15/02; E04F 15/02038; E04F 15/02133; E04F 15/02144;
(Continued)

(56) References Cited

U.S. PATENT DOCUMENTS

| 2,377,211 A | 5/1945 | Cocken |
| 4,561,232 A | 12/1985 | Gladden et al. |

(Continued)

FOREIGN PATENT DOCUMENTS

| CN | 201722894 U | 1/2011 |
| CN | 102066674 A | 5/2011 |

(Continued)

OTHER PUBLICATIONS

Search Report issued in corresponding Chinese Application No. 2017052701459170; dated Jun. 2, 2017.
(Continued)

*Primary Examiner* — Chi Q Nguyen
(74) *Attorney, Agent, or Firm* — Blake, Cassels & Graydon LLP; Brett J. Staney

(57) ABSTRACT

A self-locking mechanism that is attachable to a panel is provided. The mechanism includes a structure defining a void therein. There is also an opening in the structure coinciding with an end of the void. A pin is positioned within the void and a pin head of the pin is positioned at the opening. The pin moves back and forth within the void. The pin moves between a retracted position from within the void and an extended position. A receptacle is also positioned on the structure and oriented at an angle to the opening. The pin head is able to magnetically connect with a second receptacle from a second self-locking mechanism. The pin head or the receptacle, or both, include a magnet.

17 Claims, 24 Drawing Sheets

Related U.S. Application Data

(60) Provisional application No. 61/857,871, filed on Jul. 24, 2013, provisional application No. 61/946,351, filed on Feb. 28, 2014.

(51) Int. Cl.
| | | |
|---|---|---|
| *F16B 5/00* | (2006.01) | |
| *E04F 13/08* | (2006.01) | |
| *E04F 19/06* | (2006.01) | |
| *F16B 1/00* | (2006.01) | |

(52) U.S. Cl.
CPC ...... *E04F 15/02038* (2013.01); *E04F 19/061* (2013.01); *F16B 5/0084* (2013.01); *E04F 2201/06* (2013.01); *F16B 2001/0035* (2013.01); *Y10T 403/16* (2015.01)

(58) Field of Classification Search
CPC ...... E04F 2201/0523; E04F 2201/0505; E04F 2201/0323; E04F 2201/0541; E04F 2201/0547; E04F 2201/06; E04F 13/0833; F16B 2001/0035
USPC .. 52/578, 582.1, 582.2, 587.1, 126.6, 588.1, 52/285.4, 263, DIG. 4; 403/304, 326, 403/377, 315, 329, DIG. 1
See application file for complete search history.

(56) References Cited

U.S. PATENT DOCUMENTS

| | | | |
|---|---|---|---|
| 4,598,510 A | 7/1986 | Wagner | |
| 4,883,503 A | 11/1989 | Fish | |
| 4,899,497 A | 2/1990 | Madl | |
| 4,922,670 A | 5/1990 | Naka | |
| 5,263,289 A | 11/1993 | Boyd | |
| 5,265,386 A | 11/1993 | Muhlethaler | |
| 5,511,353 A | 4/1996 | Jones | |
| 5,818,691 A | 10/1998 | McMahan et al. | |
| 6,256,952 B1 | 7/2001 | Fahy et al. | |
| 6,463,704 B1 | 10/2002 | Jette | |
| 6,672,022 B2 | 1/2004 | Simmons | |
| RE39,097 E | 5/2006 | Schilham | |
| 7,631,467 B2 | 12/2009 | Clarke | |
| 7,650,726 B2 | 1/2010 | Jakob-Bamberg et al. | |
| 8,672,228 B1* | 3/2014 | Saini | H01R 11/30 235/486 |
| 9,748,689 B1* | 8/2017 | Kim | H01R 11/30 |
| 9,755,357 B1* | 9/2017 | Kim | H01R 13/6205 |
| 2002/0116880 A1 | 8/2002 | Greenblatt | |
| 2003/0033767 A1 | 2/2003 | Mead | |
| 2003/0053855 A1 | 3/2003 | Baur | |
| 2003/0089049 A1 | 5/2003 | Scissom et al. | |
| 2003/0110720 A1 | 6/2003 | Berard et al. | |
| 2004/0055232 A1 | 3/2004 | Jette | |
| 2004/0139671 A1 | 7/2004 | Owen | |
| 2005/0124190 A1 | 6/2005 | Mead | |
| 2010/0319291 A1 | 12/2010 | Pervan et al. | |
| 2011/0214379 A1 | 9/2011 | Norton et al. | |
| 2011/0263177 A1 | 10/2011 | Lemchen | |
| 2012/0043852 A1 | 2/2012 | King et al. | |
| 2012/0151864 A1 | 6/2012 | Pervan et al. | |
| 2013/0149029 A1 | 6/2013 | Changsrivong et al. | |
| 2013/0167458 A1 | 7/2013 | Cerny et al. | |
| 2014/0096467 A1* | 4/2014 | Norton | E04F 13/0833 52/582.2 |
| 2014/0220874 A1 | 8/2014 | Meyer | |
| 2016/0093975 A1* | 3/2016 | Katiyar | H01F 1/147 439/38 |

FOREIGN PATENT DOCUMENTS

| | | |
|---|---|---|
| DE | 202013005888 U | 10/2013 |
| EP | 2599934 A2 | 6/2013 |
| EP | 2602494 A1 | 6/2013 |
| JP | 4921586 B1 | 4/2012 |
| WO | 2008017281 A1 | 2/2008 |
| WO | 2009139687 A1 | 11/2009 |

OTHER PUBLICATIONS

Supplemetary Eurpean Search Report issued in corresponding EP application No. 14829558; search completed Jan. 31, 2017.
International Search Report from corresponding PCT Application No. PCT/CA2014/050697; search completed Oct. 10, 2014.

* cited by examiner

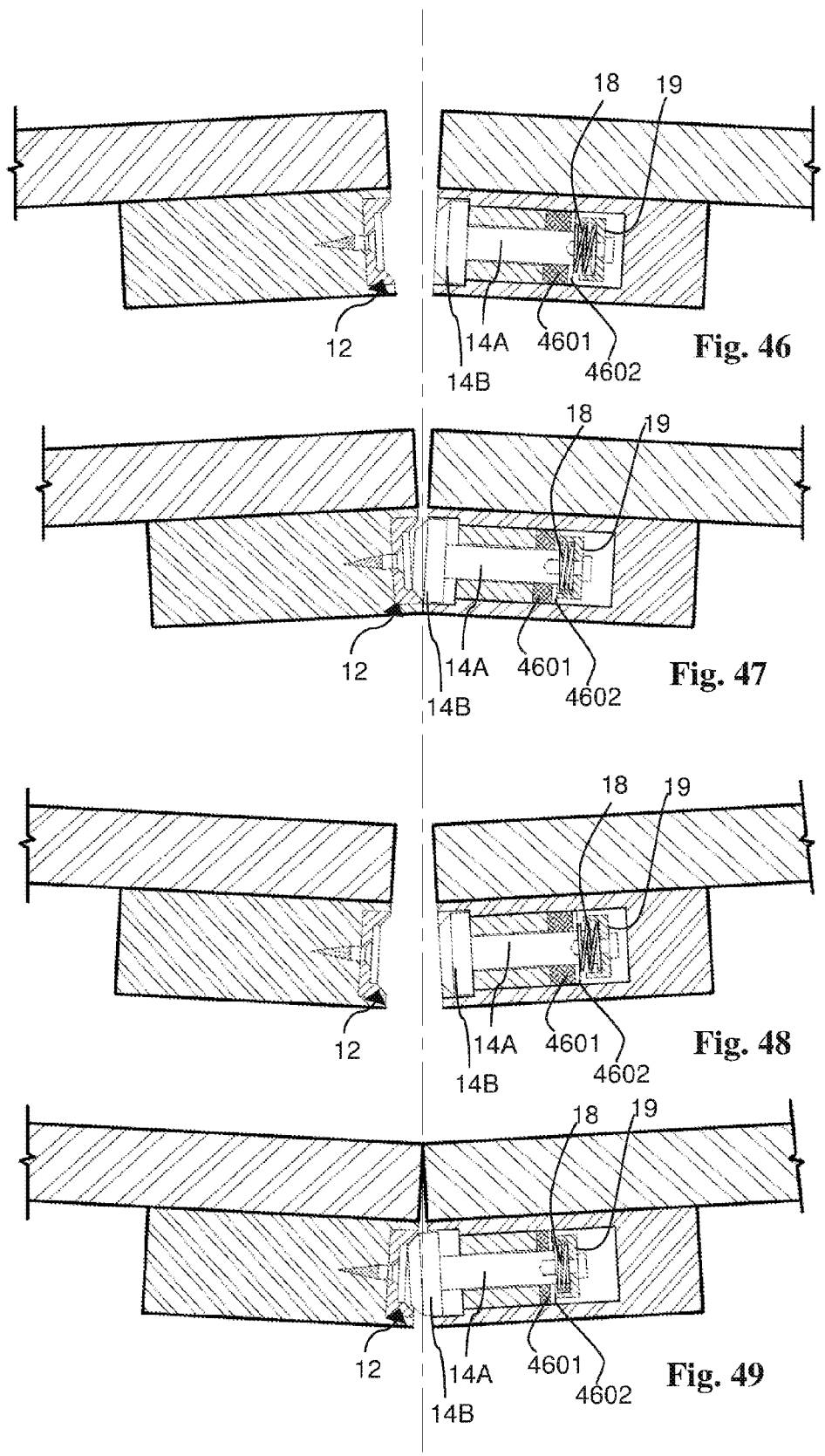

SELF-LOCKING MECHANISM AND PANELING

CROSS-REFERENCE TO RELATED APPLICATIONS

This application is a continuation of U.S. patent application Ser. No. 14/338,958 filed on Jul. 23, 2014 now U.S. Pat. No. 9,297,169, and titled "Self-Locking Mechanism and Paneling", which claims priority to U.S. Provisional Patent Application No. 61/857,871 filed on Jul. 24, 2013, and titled "Self-Locking Paneling" and U.S. Provisional Patent Application No. 61/946,351 filed on Feb. 28, 2014, and titled "Self-Locking Mechanism and Paneling" the entire contents of which are incorporated herein by reference.

TECHNICAL FIELD

The following generally relates to a self-locking mechanism.

DESCRIPTION OF THE RELATED ART

Paneling systems can be used to form floors or walls. In flooring systems, for example, panels or tiles are assembled together to form a floor surface. Floor systems include raised flooring systems. In wall systems, panels are assembled together to form wall surfaces. Wall surfaces may be used for furniture, buildings, and space separation. In many flooring and wall systems, the panels are attached together using screws, bolts, and nails. This usually requires tools to screw, bolt, or nail the panels.

BRIEF DESCRIPTION OF THE DRAWINGS

Example embodiments of a self-locking mechanism will now be described by way of example only with reference to the accompanying drawings in which:

FIG. 46 is a cross-section view of another example embodiment of a pin mechanism including a flexible bumper to increase the length of extension of the pin, the pin shown in a retracted position.

FIG. 47 is a cross-section view of the example embodiment shown in FIG. 46, the pin shown in a first extended position.

FIG. 48 is a cross-section view of another example embodiment of a pin mechanism including a flexible bumper to increase the length of extension of the pin, the pin shown in a retracted position.

FIG. 49 is a cross-section view of the example embodiment shown in FIG. 48, the pin shown in a second extended position that is extended greater than the first extended position.

DETAILED DESCRIPTION

Figure 1:
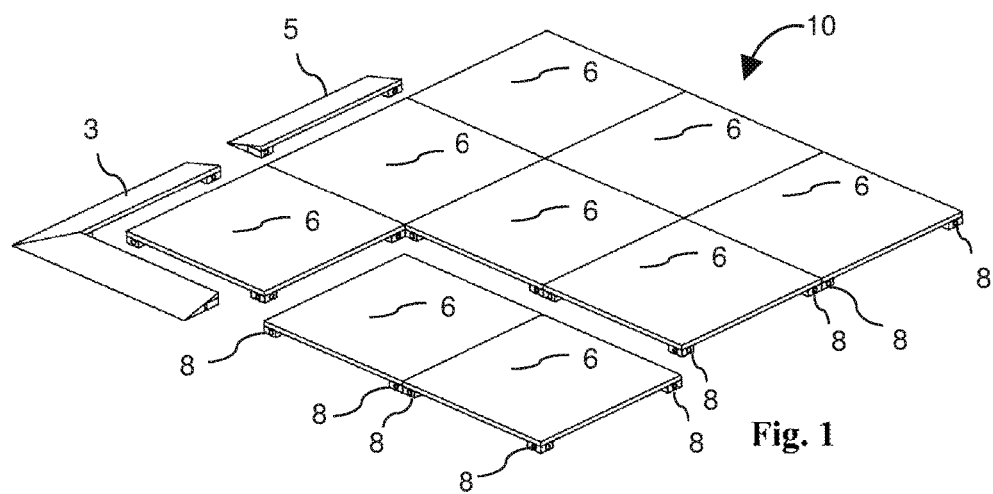
FIG. 1 is a perspective view of an example embodiment of a self-locking panel system, with some panels removed to show construction.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A paneling system includes a panel that attaches to another structure or to another panel, or both. A panel, also called a tile, board or plank, can be used in furniture, wall systems, building systems, ceiling systems, and flooring systems.

It is recognized that many paneling systems use bolts, screws, nails, or a combination thereof, to assemble the paneling system. Such paneling systems use tools, such as a screw driver, a wrench, a socket wrench, a hammer, a nail gun, etc., during assembly or disassembly, or both. In some paneling systems, the construction is such that the panels cannot be easily removed or even removed at all. A person would use a significant amount of effort, dexterity and time to assemble such a paneling system. In some cases, an equal or even greater amount of effort, dexterity and time is used to disassemble a paneling system.

It is also recognized that there are many different components to some paneling systems and this can make assembly and transport of the paneling systems. For example, with more components, more assembly steps are required. Further, it may be difficult to transport and keep track of more components during transport. If components are lost during transport, or lost in some other stage, then the paneling system will not be able to be assembled as intended. Additionally, a larger number of different components can make packaging and transport of the different components difficult.

It is recognized that it may be desirable for paneling systems to be quickly assembled and disassembled using little or no tools, and with little effort and dexterity. It is also recognized that is may be desirable to provide a paneling system with few different components, to improve simplicity of assembly and management of components. It is also recognized that fewer different components may make packaging and transport of the components easier.

In raised floor systems, for example, panels are assembled on a support structure and are assembled together to typically form a larger floor surface. Raised floor systems can be used in trade shows, conferences, concerts, stages, movies and television production sets, computer server rooms, and in many other environments. The floors are often raised to accommodate for wiring, tubing, air flow, or other things placed below the floor panels. Raised floor systems are also used when the floor below is uneven, unsightly, or undesirable for use. In such a case, a raised floor system can be laid on top of such a floor to provide a more even or a more desirable surface, or both.

Many raised floor systems are assembled together using tools, are difficult to disassemble, and are difficult to transport. This difficulty becomes even more inconvenient when there is little time to assemble and disassemble a raised flooring system, such as before and after a trade show or concert. In some cases, after a raised flooring system has been assembled in an array of panels, a person may wish to remove one of the panels located in the middle of the array. This can be difficult and time consuming since the one panel is surrounded by other panels and typically requires screws, bolts, or nails to be removed. For example, during a trade show or concert, a technician may quickly want to remove a panel from the raised floor to inspect cables located below, and then may quickly want to place the panel back in place within the raised floor. Doing so quickly and while making little distraction is desirable.

The proposed mechanisms described herein address such difficulties and desires.

Figure 2:
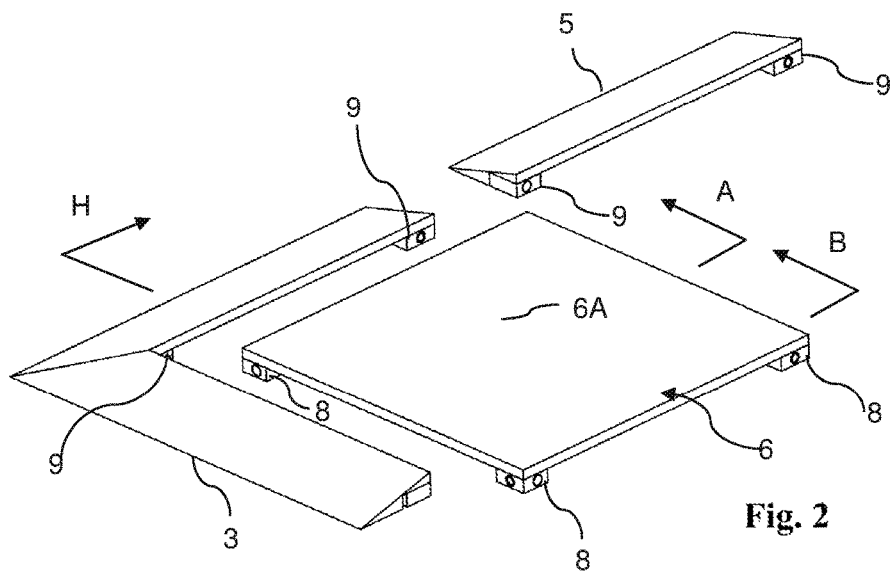
FIG. 2 is an exploded perspective view of a typical panel unit of the self-locking panel system showing a corner and straight portions of fascia trim transition as in FIG. 1.
Figure 3:
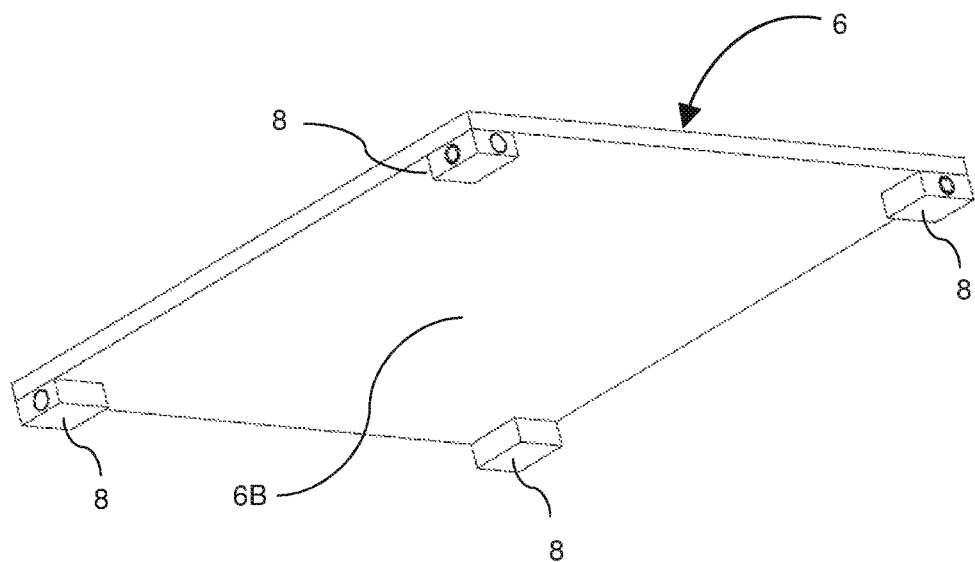
FIG. 3 is a bottom perspective view of an example embodiment of a self-locking panel shown in isolation.

Turning to FIG. 1, FIG. 2, and FIG. 3, an example embodiment of a self-locking mechanism used in a paneling system is provided. In particular, these figures show an example embodiment of a self-locking raised floor system 10 that includes floor panels 6 that are supported by pedestals 8 above another floor or ground surface (not shown). Each panel 6 includes one or more pedestals 8 and the pedestal 8 is located at a lower surface 6B of a panel 6. The upper surface 6A of a panel 6 is typically flat. However, in other example embodiments, the panel 6 may be curved, angled, ridged, rounded, etc. In other words, the shape of a panel 6 can vary depending on its application.

The self-locking mechanism is located in a pedestal 8. As will be discussed later, the self-locking mechanism uses a pin, a receptacle to receive the pin, and a magnetic force between the receptacle and pin to two or more pedestals 8 together. The pin is in one pedestal and the receptacle in in the other pedestal.

In an example embodiment, fascia frame transition components 3, 5 are connectable to the panels 6 also using a self-locking mechanism (e.g. using magnetic force and a pin). As seen best in FIG. 2, the example embodiment of a corner fascia frame transition 3 includes pedestals 9, and each pedestal 9 includes at least a part of a self-locking mechanism, either one of a pin or a receptacle, to interact with the other one of the pin or the receptacle in the pedestal 8 of a panel. Similarly, the example embodiment of a straight fascia frame transition 5 includes a pedestal 9 and the pedestal 9 includes at least a part of a self-locking mechanism, which is either one of a pin and a receptacle, to interact with the other one of the pin and the receptacle in the pedestal 8 of a panel.

Figure 4:
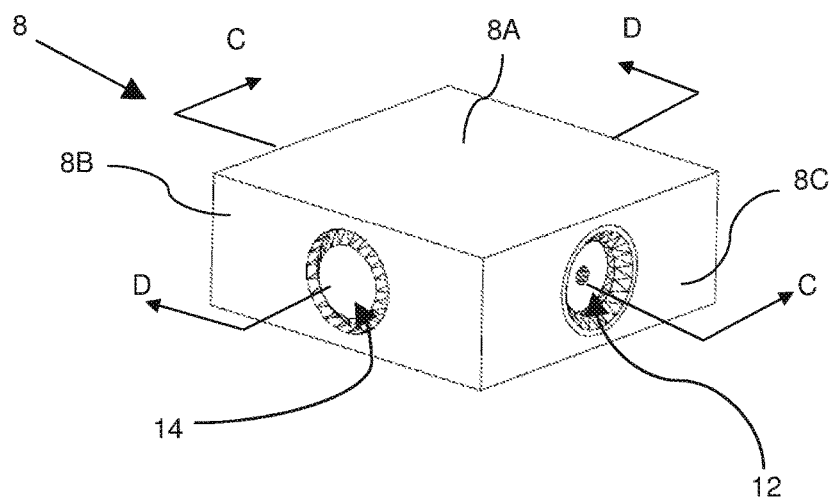
FIG. 4 is a perspective view of an example embodiment of a pedestal shown in isolation.

Turning to FIG. 4, a more detailed view of an example embodiment of a pedestal 8 is shown in isolation. The pedestal supports the panel above a ground surface. The pedestal body can be made of plastic, wood, metal, or other materials or combinations of materials. The pedestal body includes a top surface 8A, which, for example, can interface with the panel's bottom surface 6B. The pedestal also includes side surface 8B and 8C. The pedestal includes a receptacle 12 and a pin mechanism 14. In the example embodiment shown, the receptacle 12 is embedded in the side surface 8C and the pin mechanism is embedded in the side surface 8B. In the example shown, the side surfaces 8B and 8C are oriented at approximately 90 degrees with respect to each other and face away from each other. When the pedestal is mounted to the panel 6, the side surfaces 8B and 8C face away from the perimeter of the panel, so that the receptacle 12 and pin 14 also face away from the perimeter of the panel. This example configuration allows the pedestal to connect to other pedestals. Other configurations of pedestals that facilitate connection with other pedestals using a receptacle and pin mechanism are applicable to the principles described herein. It can be appreciated that in another example embodiment, a pedestal has only one of the pin and the receptacle, rather than both.

Figure 5:
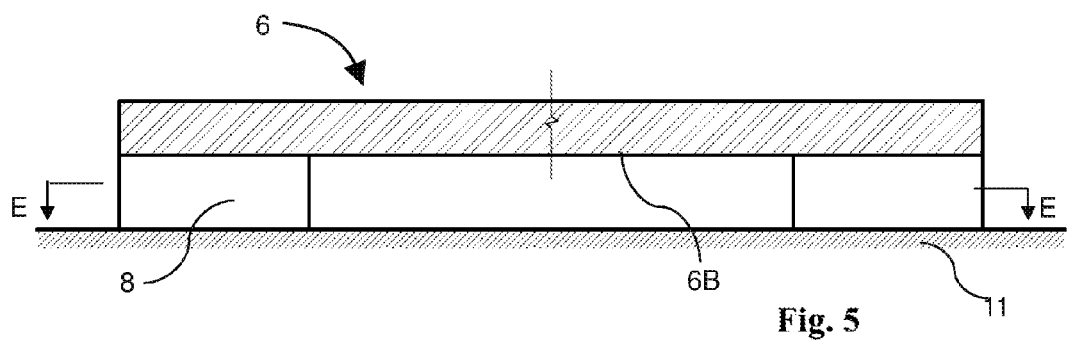
FIG. 5 is a cross-section view of the panel taken along the cross-section line A-A in FIG. 2.

Turning to FIG. 5, a cross-section view of the panel 6 taken along the cross-section line A-A in FIG. 2 is shown. The cross-section shows the pedestals 8 secured to the bottom surface 6B of the panel. A pedestal can be secured to the panel by adhesive, screws or other fasteners. Other ways of securing the pedestal to the panel can be used. In an example embodiment, the thickness of the pedestals 8 provides space between the ground surface 11 and the bottom of the board 6B for electrical, computer or other wire or pipe located below the panel. It can be appreciated these same principles can be applied to wall paneling, where the panels 6 are oriented approximately vertically, or at any other angle, and are spaced apart from another walled surface using the pedestals.

Figure 6:
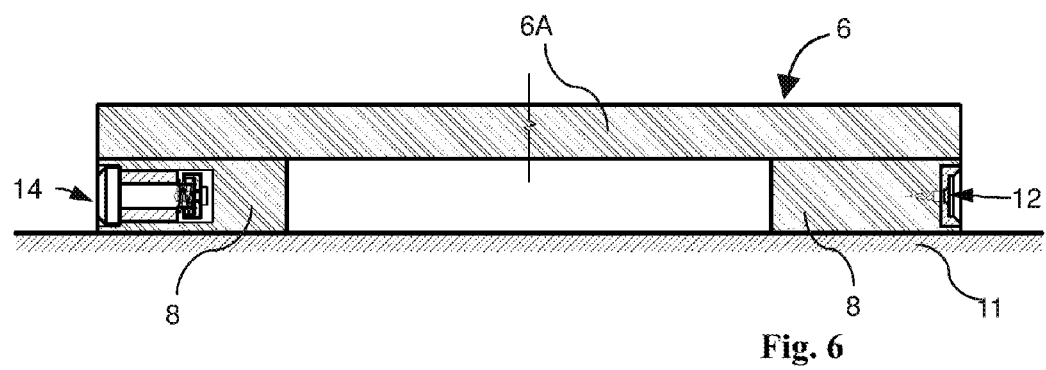
FIG. 6 is a cross-section view of the panel taken along cross-section line B-B in FIG. 2.

FIG. 6 is a cross-section view of the panel taken along cross-section line B-B in FIG. 2. The cross-section shows two example pedestals 8. One pedestal shows the pin 14 embedded therein, and the other pedestal show the receptacle 12 embedded therein.

Figure 7:
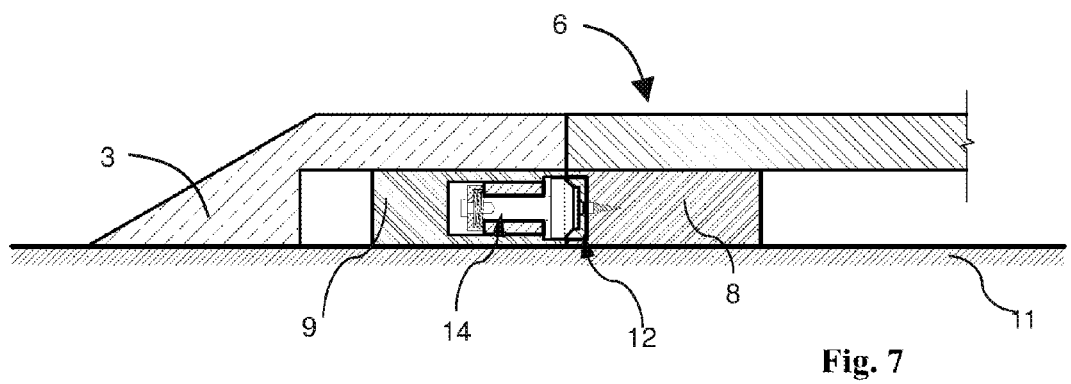
FIG. 7 is a cross-section view taken along cross-section line H-H in FIG. 2 showing the panel connected to the fascia trim transition.

FIG. 7 is a cross-section view taken along cross-section line H-H in FIG. 2 showing the panel 6 connected to the fascia trim transition 3. It also shows the pin 14 engaged with the receptacle 12 using magnetic force. When the pin is engaged with the receptacle, both a mechanical and magnetic force are used to connect the pedestals together, and consequently also connect the parts attached to each pedestal (e.g. panels, fascia trim transition, etc.) together.

In an example embodiment, as shown in FIG. 7, when the pin 14 is engaged with the receptacle 12, the pin is in an extended position. Otherwise, when the pin in not engaged or under the influence of a magnetic force from the receptacle, the pin is in a retracted position.

Figure 8:
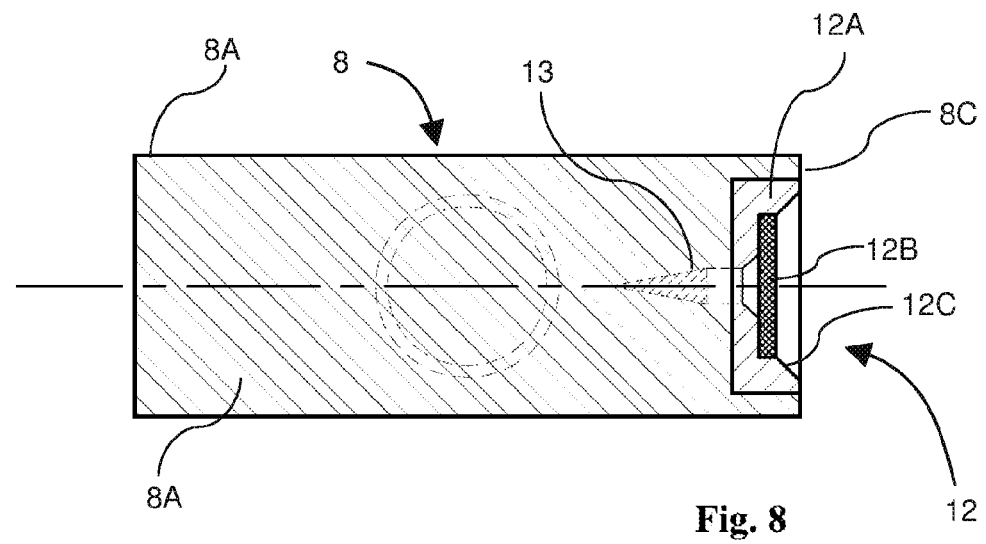
FIG. 8 is a cross-section view of the pedestal taken along cross-section line C-C in FIG. 4.
Figure 9:
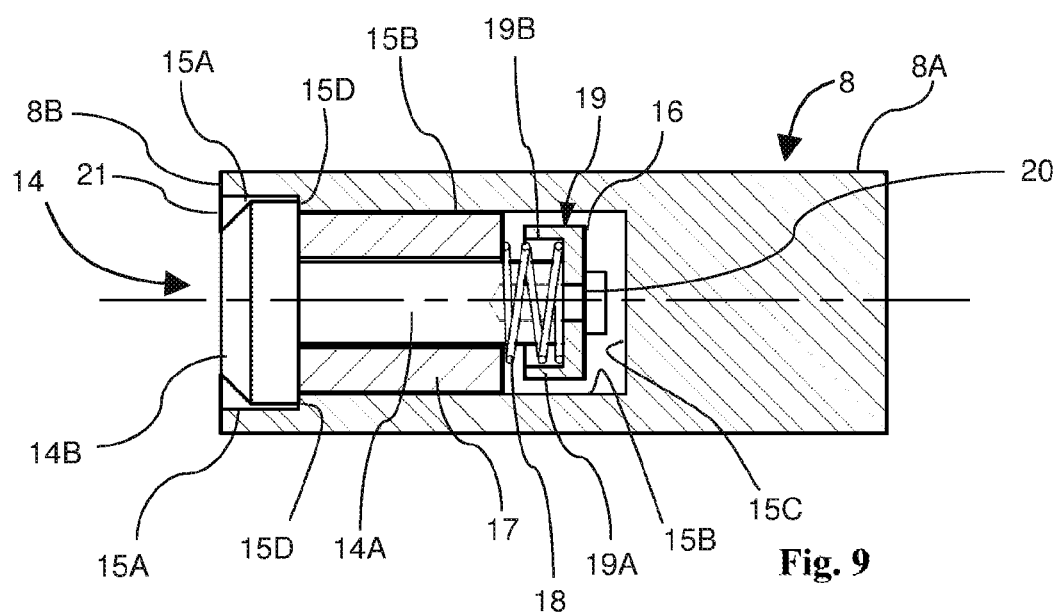
FIG. 9 is a cross-section view of the pedestal taken along cross-section line D-D in FIG. 4.

Further details about the pin and the receptacle are provided with respect to FIG. 8 and FIG. 9

FIG. 8 is a cross-section view of the pedestal 8 taken along cross-section line C-C in FIG. 4. It shows the receptacle 12, which includes a magnet casing 12A for holding a magnet 12B in position. The magnet casing 12A includes a tapered wall 12C extending generally from the perimeter of the magnet 12B. The magnet 12B and the tapered wall 12C can be used to mechanically interface with the pin 14. It can be appreciated that the magnet 12B and the tapered wall 12C are embedded within the pedestal 8 according to the illustrated example, but in other example embodiments, such components may protrude from the pedestal. In an example embodiment, the tapered wall 12C has a frustoconical shape. The casing 12A may be secured to the pedestal using a screw 13 or nail, although other methods and components can be used to secure the casing to the pedestal.

Other configurations for a receptacle 12 that exert a magnetic force, or that can react to a magnetic force, and that can receive a pin 14 can be used. For example, the pin may exert a magnetic force, which can react with (e.g. draw close) the receptacle.

FIG. 9 is a cross-section view of the pedestal 8 taken along cross-section line D-D in FIG. 4. It shows the pin 14 embedded therein. The pin 14 includes a head 14B and a shaft 14A. In an example embodiment, the head 14B has a tapered shape. The taper, for example, is 45 degrees, although other angles can be used. The taper on the head 14B can be frustoconical. The head 14B mas also have a larger cross-sectional width compared to the cross-sectional width of the shaft 14A. Preferably, the pin head is made of steel or some other material that can be influenced by a magnetic field. It will be appreciated however, that the pin shape can vary, and the pin shown in FIG. 9 is just an example. In another example embodiment, the pin head includes magnetic material, such that it exerts a magnetic force.

A space or void 16, defined by at least side walls 15A and 15B, is provided to house the pin 14. The space 16 may also be defined by a back wall 15C. Side wall 15A defines the opening 21 through which the pin 14 travels in and out of, and has a larger interior perimeter than side wall 15B. In this way, the pin head 14B is restricted from travelling beyond a certain distance backwards within the space 16. In an example embodiment, when the pin 14 is in a retracted position, as shown in FIG. 9, the head 14B does not protrude beyond the opening 21. Further, the configuration of the side walls 15A and 15B restrict the backward movement of the pin 14, so that in the retracted position, the tip of the head 14B is approximately flush with the opening 21.

In FIG. 9, the side wall 15A and the side wall 15B are separated by a shoulder surface 15D. The shoulder surface is approximately perpendicular to both side walls 15A and 15B. The shoulder surface 15D restricts the pin head 14B from moving beyond a certain distance towards the interior of the space 16. In other example embodiments, the shoulder surface 15D can be angled or tapered.

In other example embodiments, there is no shoulder surface, and the side wall 15A and the side wall 15B form a continuous wall that is tapered, where the opening 21 is larger than an interior portion of the space 16. The continuous tapered wall also serves to restrict the pin head 14B from moving beyond a certain distance towards the interior of the space 16.

In a preferred embodiment, the space 16 has a circular cross-sectional along its width, thereby forming a cylindrical shaped space 16. However, other geometries can be used with the principles described herein.

Continuing with FIG. 9, a bushing 17 restricts movement of the pin shaft 14A along the length of the shaft 14A, while still allowing the pin head 14B and shaft 14A to move longitudinally in and out of the space 16. A compressed spring 18 is positioned between one end of the bushing 17 and a stopper cap 19 that is fixed towards the end of the pin shaft 14A. In other words, the compression spring 18 exerts a pushing force against the bushing 17 and the stopper cap 19. This force places the pin 14 in a retracted position. The stopper cap 19 preferably, although not necessarily, has a wall 19A which is protruding from a bottom surface 19A of the stopper cap. The wall 19A helps to retain the spring 18. The spring 18, for example, is a coil spring, although other types of compression springs can be used.

The stopper cap 19 can be secured to the end of the shaft 14A in various ways, including for example, using a bolt 20.

It will be appreciated that the magnetic force M exerted between the receptacle 12 and the pin 14 is sufficient to overcome the spring force S. In an example embodiment, the spring force S is substantially smaller than the magnetic force M. The spring force S should be sufficient to overcome the friction F between the pin shaft 14A and the bushing 17, in order to keep the pin 14 in a retracted position in the absence of sufficient magnetic force.

In some example embodiments, a pedestal 8, 9 may just have a pin mechanism, or may just have a receptacle. As will be discussed later, the pin mechanism can be embedded in various other structures, not limited to a pedestal. Similarly, the receptacle can be embedded in various other structures, not limited to a pedestal.

Figure 10:
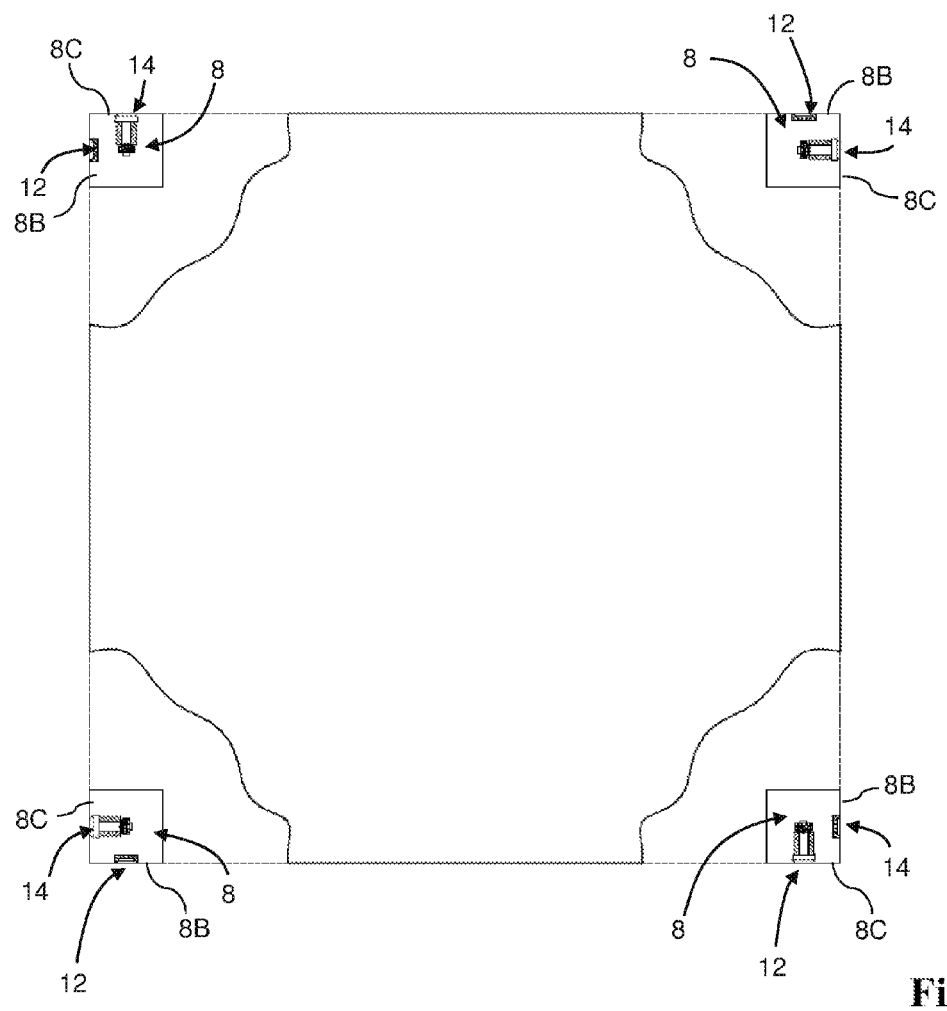
FIG. 10 is a plan view of a panel with partial cut-away views of the panel and the pedestals along cross-section line E-E in FIG. 5.

Turning to FIG. 10, a plan view of a panel with partial cut-away views of the panel and the pedestals along cross-section line E-E in FIG. 5. The pedestals 8 are positioned at the corners of a panel 6. In other words, the panel 6 has four pedestals 8. The side surfaces 8B and 8C of the pedestal are approximately parallel to at least one of the edges of the panel 6. The positions and orientation of pedestals 8, including the positions of the pins and receptacles, allow for the universal assembly of multiple panels 6 having the same configuration. In this way, each of one of the receptacles on one panel will always face a steel pin mechanism on a different panel. In other words, the pins and receptacles on the pedestals are arranged in such a way that along each side of the panel 6, there is at least one receptacle and at least one pin facing in the same direction and positioned on the same side of the panel. The receptacle and the pin are preferably, though not necessarily, positioned at different ends on the same side, as shown in FIG. 10 by the spacing of the pedestals at the corners of the panel. This example configuration facilitates multiple panels, each having the same configuration, to be assembled together to make a raised floor. Other configurations of pedestals, pins, and receptacles can be used to connect multiple panels together.

In an example embodiment, not shown, a pedestal 8 is positioned towards the middle of the length of an edge of a panel 6, rather than at the corner of the panel, or in addition to the pedestals located at the corner of the panel. Such a pedestal may have only one of the receptacle and the pin.

It can be appreciated that the panel does not need to be rectangular, as shown in the figures. For example, a panel can be triangular, rounded, pentagonal, hexagonal, etc., or have some irregular shape.

Figure 11:
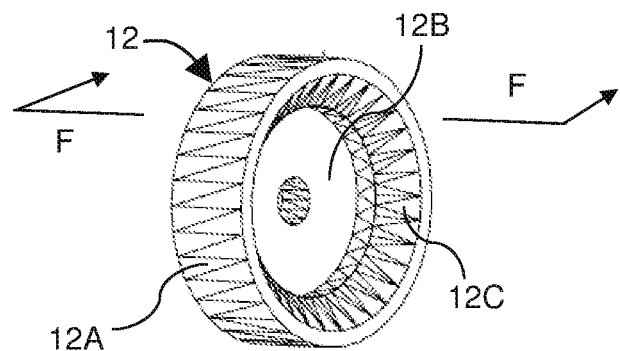
FIG. 11 is a perspective view of an example embodiment of a magnet receptacle used in a self-locking mechanism.
Figure 12:
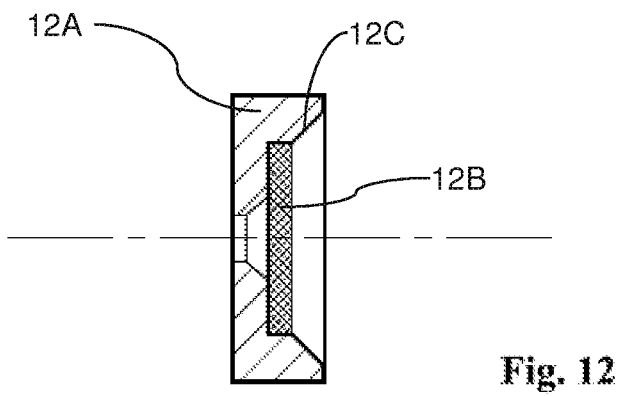
FIG. 12 is a cross-section view of the magnet receptacle along cross-section line F-F in FIG. 11.

Turning to FIG. 11 and FIG. 12, the receptacle 12 includes a magnet casing 12A and magnet 12B, for example, in a round shape. The magnet casing 12A may have a hole in the case for using a screw to secure it to the pedestal 8. The wall 12C has a shape and size that corresponds to the shape and size of the pin head 14B. The tapered wall 12C helps to align the pin head 14B and to increase the magnetic force exerted by the magnet 12B.

In another example embodiment, the entire magnet casing 12A may be made of magnetic material, including the tapered wall 12C.

Figure 13:
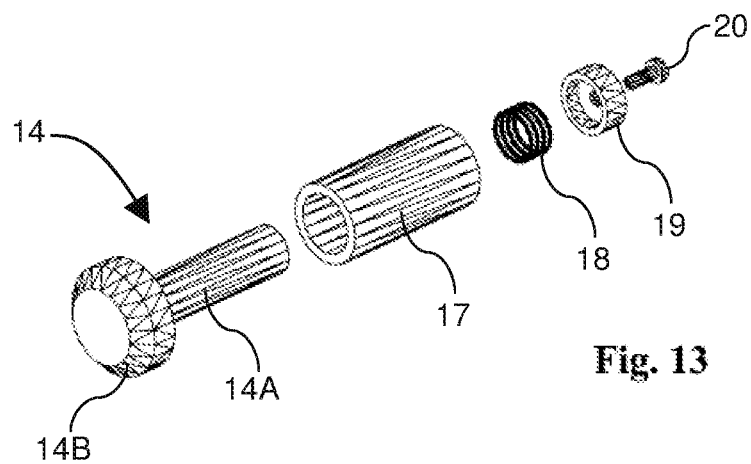
FIG. 13 is an exploded perspective view of an example embodiment of a pin mechanism used in a self-locking mechanism.

Turning to FIG. 13, the exploded view of the pin mechanism is shown. It includes the pin 14, the bushing 17, the spring 18, the stopper cap 19, and the bolt 20.

Figure 14:
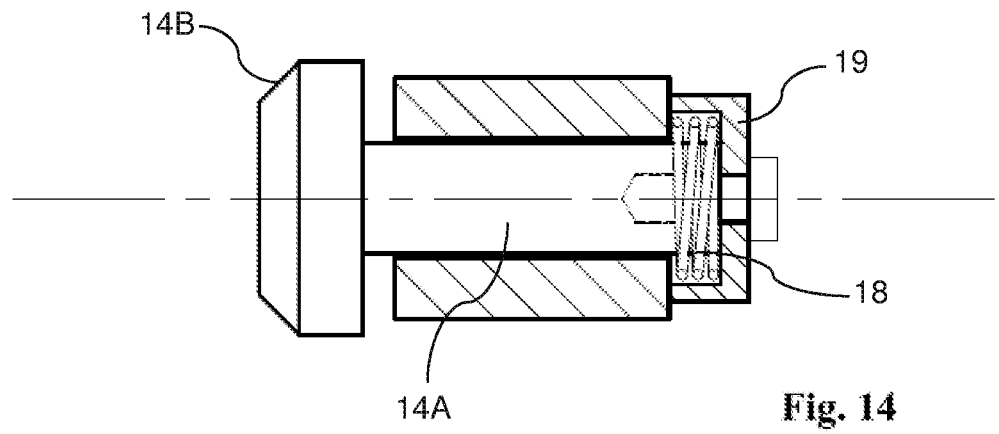
FIG. 14 is a cross-section view of an example embodiment of an assembled pin mechanism shown in an extended position.
Figure 15:
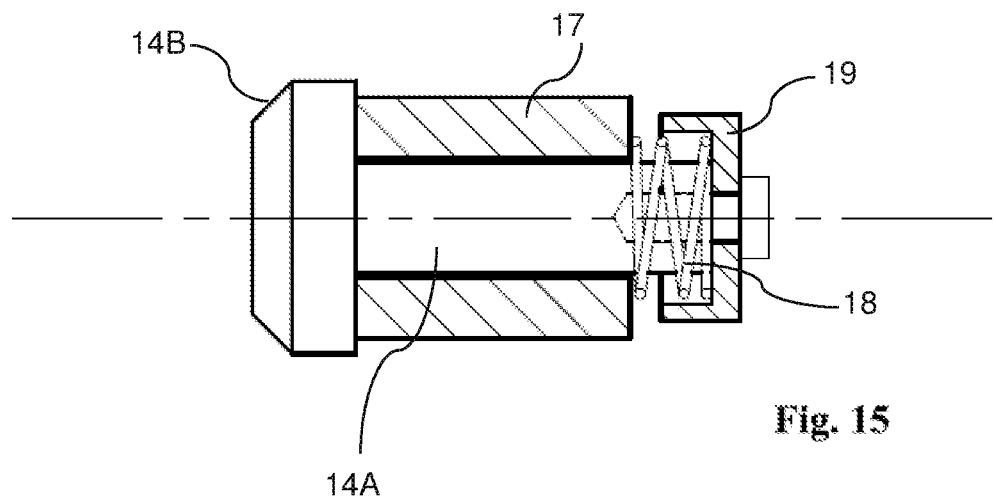
FIG. 15 is a cross-section view of an example embodiment of an assembled pin mechanism shown in a retracted position.

FIG. 14 and FIG. 15 show the pin mechanism in an extended state and a retracted state, respectively. In the extended state, the pin head 14B has moved forward relative to the retracted state and the spring 18 is compressed or further compressed between the bushing 17 and the stopper cap 19. The pin may be pulled from the retracted state to the extended state by a magnetic force interaction with the receptacle.

In the retracted state, as per FIG. 15, the spring 18 is not compressed, or is not as compressed relative to the extended state.

FIGS. 16-21 show different stages of engagement and disengagement between two connecting pedestals 8 respective to adjacent panels 6.

Figure 16:
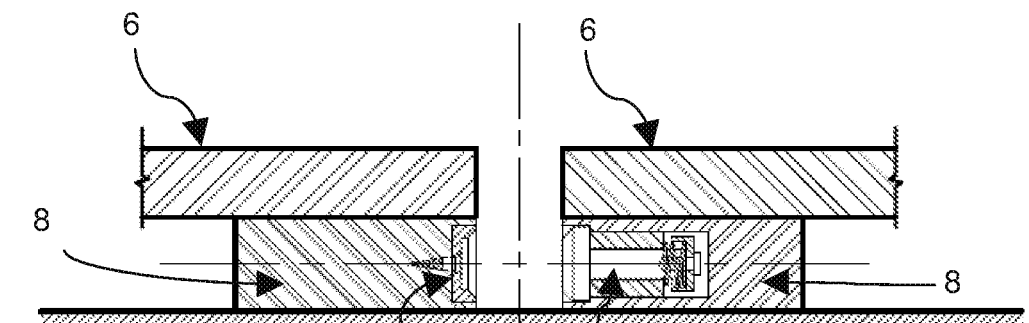
FIG. 16 is a cross-section view of two adjacent self-locking panels disengaged from each other.
Figure 17:
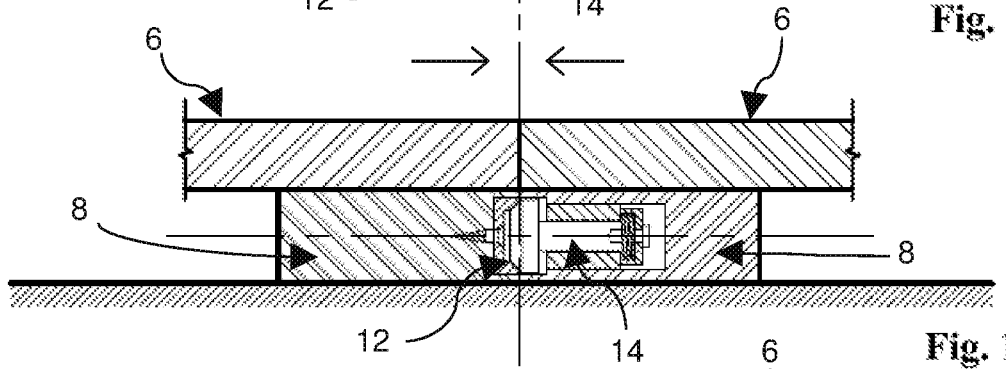
FIG. 17 is a cross-section view of two adjacent self-locking panels engaged with each other.

FIG. 16 shows the position of two adjacent panels 6 and their two opposing connecting pedestals 8 prior to being in the locked position in FIG. 17. The distance between these panels 6 is such that the magnetic force exerted between the pin 14 and the receptacle 12 is not sufficient to pull the pin 14 from a retracted state to an extended state. Thus, the pin 14 is shown in the retracted state. In this position, the spring 18 (force S) acts to keep the pin 14 inside the pedestal body 8.

FIG. 17 shows the two panels 6 removably connected to each other. In this position, magnetic force M of the magnet 12B forces the pin 14 to move toward the receptacle 12. The forward or extended position of the pin 14 is limited by the receptacle 12 on one side and the stopper cap 19 at the other side. This position provides a firm connection between the receptacle 12 and the pin 14 and, therefore, connecting the pedestals 8 and panels 6 together. The locked connection between the pin and receptacle is based on a magnetic force from the magnet, mechanical static forces based on the configuration of the pin and the receptacle, and frictional forces based on the material and configuration of the pin and the receptacle.

Figure 18:
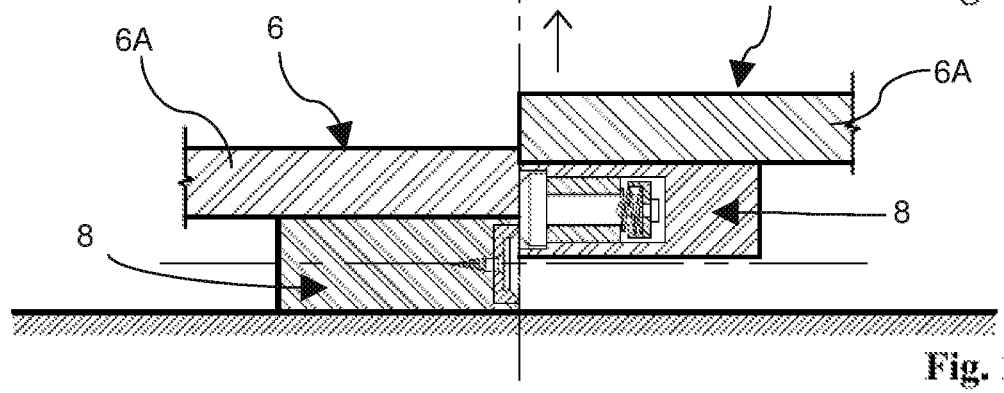
FIG. 18 is a cross-section view of two adjacent self-locking panels in the process of moving from an engaged configuration to a disengaged configuration, or moving from a disengaged position to an engaged position.
Figure 19:
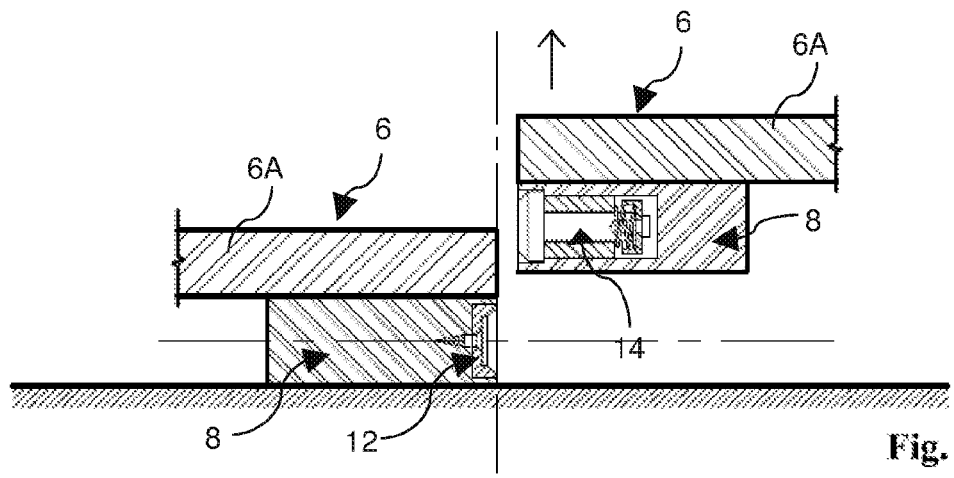
FIG. 19 is another cross-section view of two adjacent self-locking panels disengaged from each other.

FIGS. 18 and 19 show disengagement as a result of the application of vertical force to at least one of the two adjacent panels 6. This may occur, for example, when removing an inner panel surrounded by other connected panels. These figures show the interaction between the tapered wall 12C of the receptacle 12, the magnet 12B, and the pin head 14B. By moving one of the panels 6 up, or the other panel down, the interaction between walls 12C and the tapered pin head 14A creates a horizontal force pushing the pin 14 away from the magnet 12B and towards the interior of the pedestal 8.

An example relationship between the forces is shown by:

$$P_{lift} > (A \times f) + M + (B \times f1) - S_{spring} \qquad \text{Equation 1:}$$

Where:
$S_{spring}$ is the spring force.
$P_{lift}$ is the lifting or pulling force exerted on a panel.
A is the surface area of contact between the tapered wall 12C and the pin head 14B.
M is the magnetic force.
B is the surface area of contact between the pin shaft 14A and the bushing 17.
f is the coefficient of friction between the tapered wall 12C and the pin head 14B.
f1 is the coefficient of friction between the pin shaft 14A and the bushing 17.

It can be appreciated that when the lifting or pulling force $P_{lift}$ satisfies Equation 1, then the panel will be able to be removed. It can be appreciated that Equation 1 only accounts for the interaction between one pin 14 and one receptacle 12, and can be modified to account for multiple pins and receptacles using the same principles.

Figure 20:
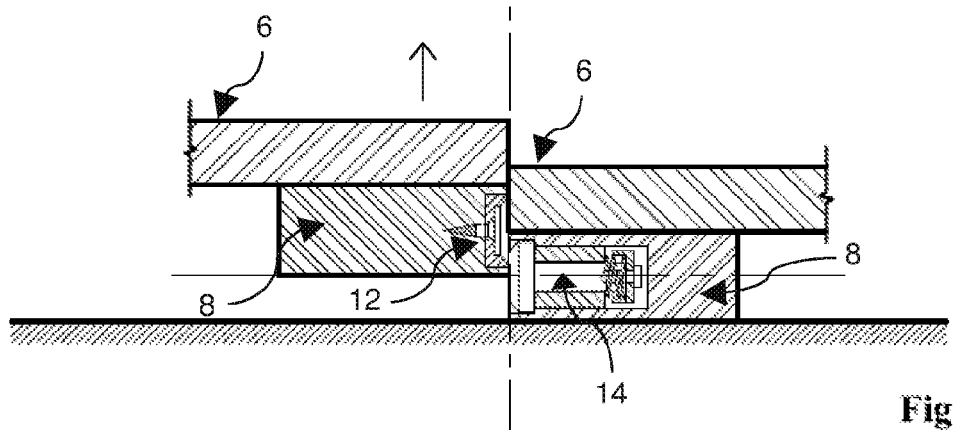
FIG. 20 is another cross-section view of two adjacent self-locking panels in the process of moving from an engaged configuration to a disengaged configuration, or moving from a disengaged position to an engaged position.

FIG. 20 shows disengagement between pin 14 and the receptacle 12, as well as the between the panels, when a vertical force is applied at the receptacle location.

Figure 21:
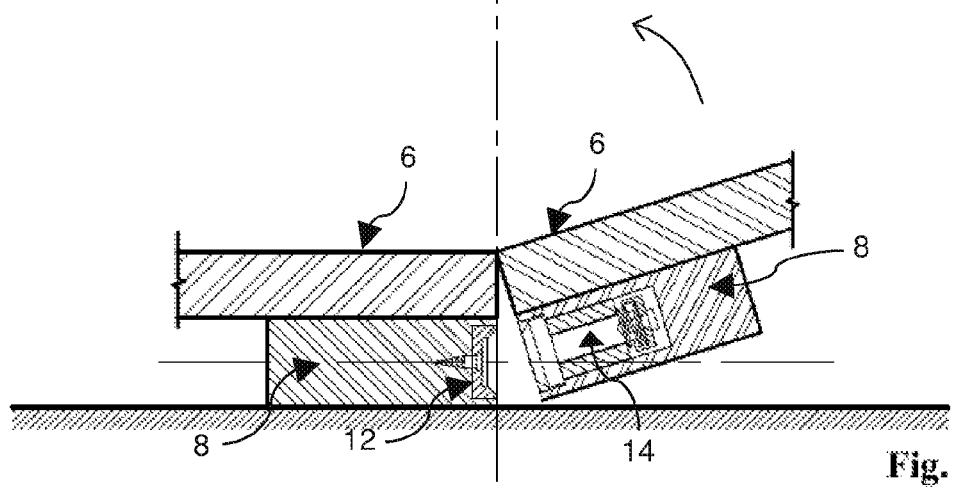
FIG. 21 is another cross-section view of two adjacent self-locking panels in the process of moving from an engaged configuration to a disengaged configuration, or moving from a disengaged position to an engaged position.

FIG. 21 shows disengagement of the panels using a rotation motion. In other words, by pivoting or rotating one panel relative to another panel, the pin will disengage from the receptacle. This movement may be used, for example, when removing panels located at the edge of a panel assembly or flooring assembly.

It can be appreciated that the above example embodiments allow two panels to be easily and quickly connected together. A user would only need to position two panels relatively close together, and because of the magnetic force, a pin and a receptacle would self-align with each other and cause the pin to extend and engage the receptacle. This provides a self-locking operation when two panels are brought close together. In other words, a user does not need a lot of dexterity and accuracy when assembling a raised floor or any other paneling system. In the example of raised floors, the user could simply place the panels on the floor and kick the panels towards each other so that the edges meet. The pin and receptacle will engage each other without any tools or special operations.

Furthermore, when packing and storing the panels, it is possible for there to be no parts or components protruding from the edge of the panel because the pin is in a retracted state in the absence of a magnetic force. This configuration allows the panels to be stored efficiently and easily.

Furthermore, regardless of the orientation of a panel relative to another panel, assuming they are generally lying within the same plane, the two panels can be connected to each other. A special or specific orientation is not required.

Additionally, the configuration of the panel described herein allows for the panel to be slid in between two other panels on both sides, and to lock the panel with the two other panels, without any tools. The panel can slide into position between the two other panels because there are no protrusions on the panel's sides. Thus the panel can be flush with the two other panels when sliding the panel in position. The panel can lock with two other panels because the pins will automatically extend when there is a magnetic interaction with the receptacles.

Such convenience is also available when removing and adding a "locked" panel that is surrounded by other locked panels. If a sufficient pulling or lifting force is provided, an interior panel can be removed from the surrounding panels. Conversely, it is very easy for a panel to be added back to the vacancy in the panel assembly and for the panel to self-lock with the surrounding panels.

The panel mechanism has few unique components, and thus, reduces manufacturing costs. As shown in FIG. 10, multiple instances of the same panel can be used to build large paneling or flooring structures.

Figure 22:
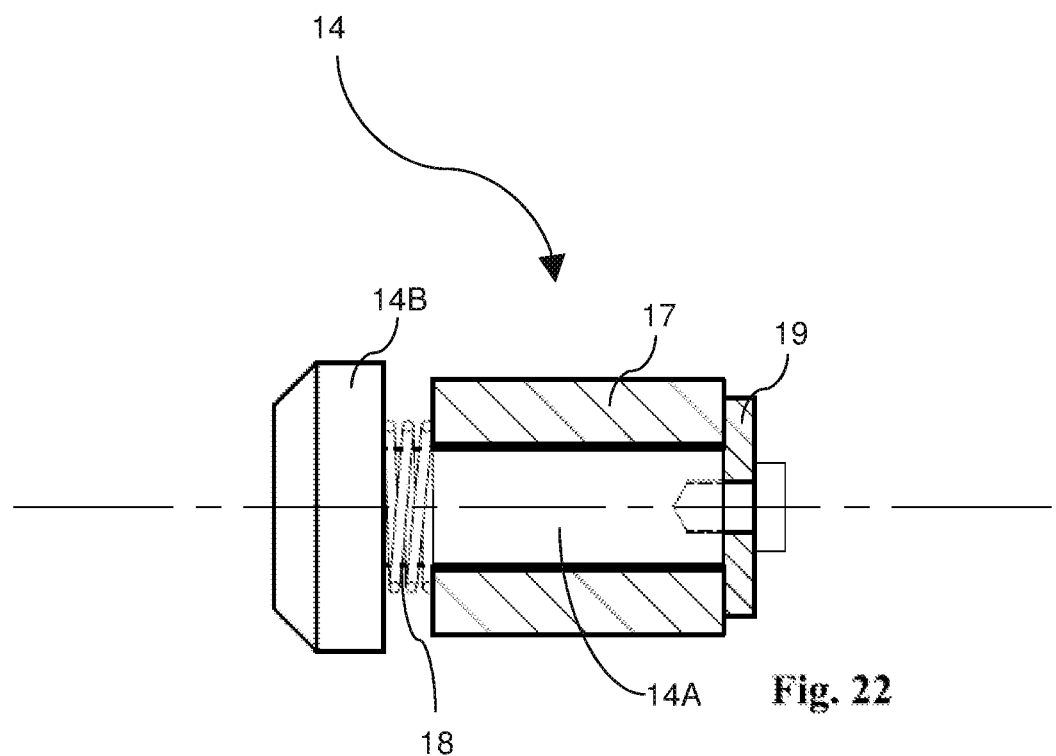
FIG. 22 is an example embodiment of a pin mechanism used in a self-locking mechanism, with the default position being an extended position.

Turning to FIG. 22, an alternative embodiment of a pin mechanism is provided where, even in the absence of a magnetic force or any other force external to the pin mechanism, the pin 14 is in an extended state. The spring 18 is positioned between the pin head 14B and the bushing 17. The stopper cap 19 prevents the pin 14 from sliding all the way out of the bushing 17. When positioned within a pedestal or panel, the pin head 14B may protrude from the pedestal or panel surface. When the pin is pushed against a receptacle, the pin retracts within the space 16 and the spring 18 compresses.

$$P_{lift} > (A \times f) + M + (B \times f1) + S_{spring} \qquad \text{Equation 2:}$$

When the lifting or pulling force satisfies Equation 2, the pin shown in FIG. 22 will disengage or separate from the receptacle.

Figure 23:
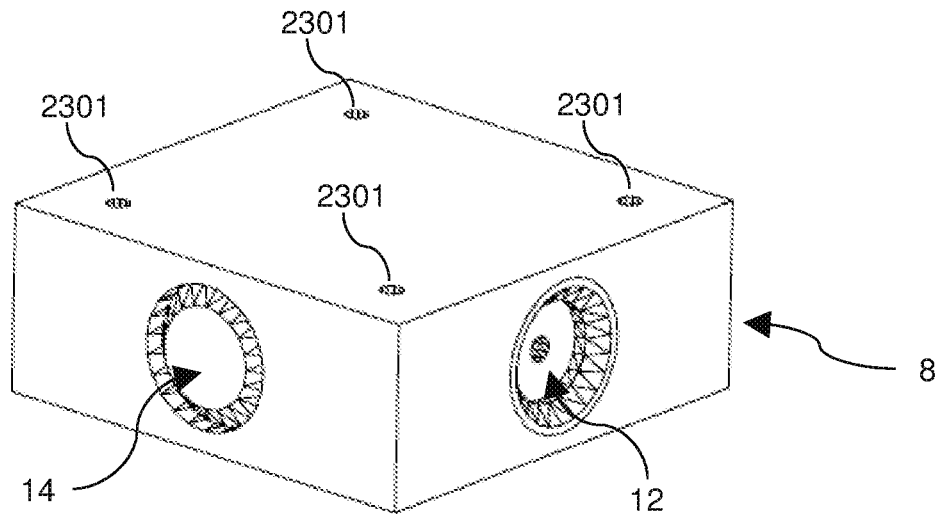
FIG. 23 is an example embodiment of a pedestal including holes used to secure the pedestal to a panel.

Turning to FIG. 23, another example embodiment of a pedestal 8 is shown in isolation. The pedestal 8 includes holes 2301 to receive dowelling. The dowelling can be used to quickly secure the pedestal 8 to the panel 6.

Figure 24:
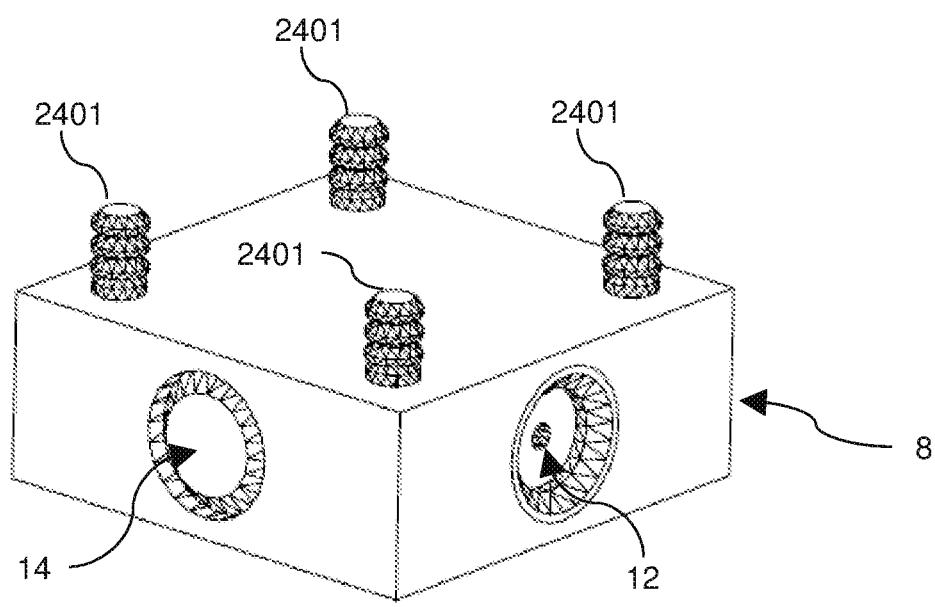
FIG. 24 is an example embodiment of a pedestal including dowels used to secure the pedestal to a panel.

In FIG. 24, pedestal 8 includes protrusions or dowels 2401 that already secured to the pedestal body. In a preferred example embodiment, the protrusions or dowels 2401 and the pedestal body are a unitary piece. In this way, during assembly, a user can quickly hammer or press the pedestal into pre-formed holes within the panel. Furthermore, by making the protrusions or dowels unitary with the pedestal body, if an adversary wishes to steal the pedestal only, the adversary will need to break the protrusions or dowels in the process. This will result with the adversary having a broken pedestal that cannot be easily attached again with other panels. In an example embodiment, the protrusions or dowels 2401 have ridges or teeth to help permanently lock the pedestal in place when it is assembled with a panel.

Figure 25:
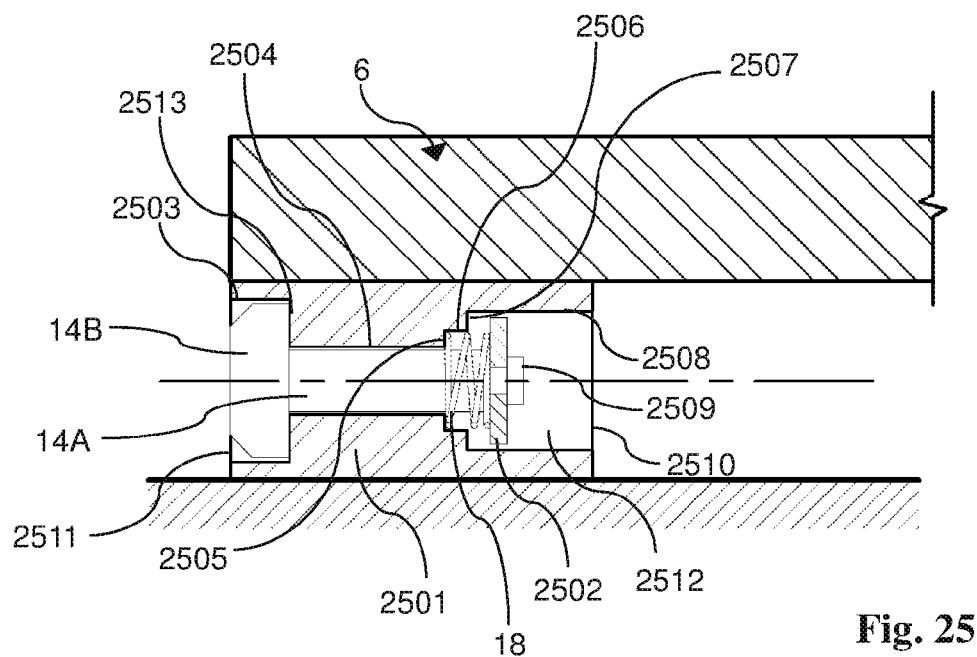
FIG. 25 is a cross-section view of an example embodiment of a pin mechanism integrated with a pedestal, shown in a retracted position.

Turning to FIG. 25, another example embodiment of a pedestal and pin mechanism is shown. The pedestal 2501 has a space or void 2512 defined within itself by interior walls or surfaces 2503, 2513, 2504, 2505, 2506, 2507 and 2508. The pin head 14B passes through an opening 2511 defined by the surface 2503. Another opening 2510 is defined by surface 2508 and this opening 2510 allows for easy assembly and access to the pin mechanism, including a stopper cap 2502 and the compression spring 18.

The surface 2503 defines a portion of the space 2512 that houses the pin head 14B. A shoulder surface 2513 between the surface 2503 and the surface 2504 acts to restrict the pin head 14B from moving beyond a certain distance towards the interior of the space 2510. The surface 2504 defines another portion of the space 2512 that houses the pin shaft 14A and acts to restrict the shaft's movement from side to side, while still allowing the shaft 14A to move longitudinally. Another shoulder surface 2505 is provided to restrict longitudinal movement of the spring 18. In other words, the spring 18 braces against the shoulder surface 2505. Surface 2506, which is approximately parallel to surface 2504, is used to help restrict lateral or sideways movement of the spring 18. Another shoulder surface 2507 is used to restrict the stopper cap 2502, and thus the pin 14, from moving beyond a certain distance.

It will be appreciated that there are less components. Furthermore, the stopper cap 2502 can be a flat washer. The example embodiment in FIG. 25 also allows for easier access to a bolt 2509, the stopper cap 2510 and the spring 18. This, in turn, allows for the pin mechanism to be more easily assembled, disassembled, cleaned, or repaired, if desired.

Figure 26:
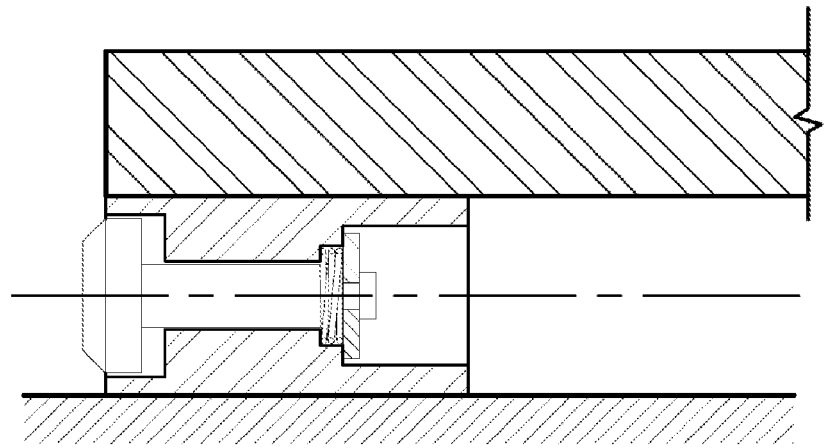
FIG. 26 is a cross-section view of the example embodiment shown in FIG. 25, but with the pin mechanism shown in an extended position.

As shown in FIG. 25 the pin is in a retracted state. In FIG. 26 the same pin in shown in an extended state, where the spring is compressed or further compressed.

Figure 27:
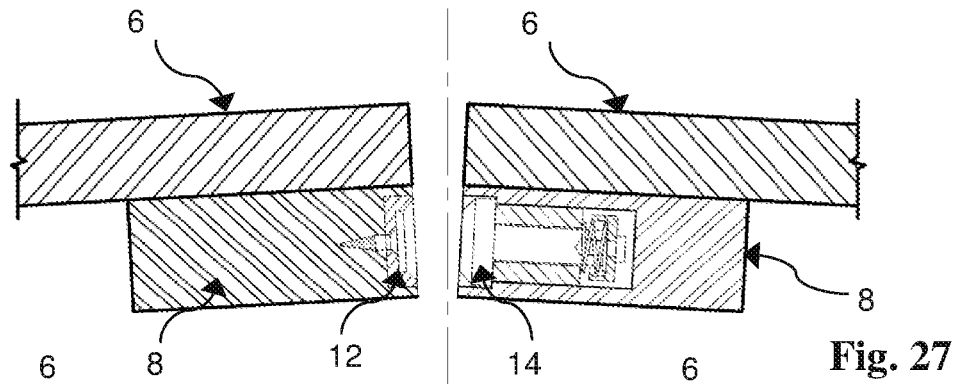
FIG. 27 is a cross-section view of an example embodiment of two panels angled upwards and spaced apart from each other, with the pin in a retracted position.
Figure 28:
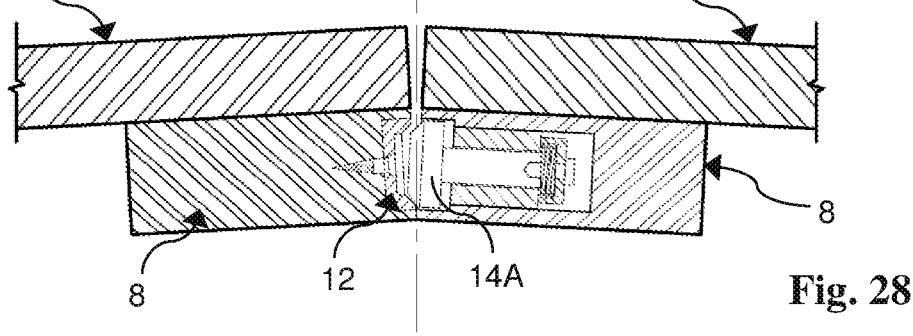
FIG. 28 is a cross-section view of the example embodiment shown in FIG. 27, but with the lower portion of the pedestals placed in contact with each other and with the pin in an extended position.

FIG. 27 and FIG. 28 show two panels 6, each having a pedestal 8. FIG. 27 shows the two panels coming closer together, where one of the panels is angled relative to another. The panels may be angled relative to each other because the surface (e.g. the ground surface) on which the panels are supported above is not flat. In other words, there may be bumps or unevenness on the surface. However, even in such circumstance, as shown in FIG. 28, the pin head 14B moves to an extended state to engage the receptacle 12. Even if the pedestals, and thus the panels, are angled, the magnetic force between the receptacle and the pin draw each other together. In FIG. 28, at least part of the surface of the pin head 14B is in contact with at least part of the surface of the receptacle 12. The tapered surface of the receptacle and the tapered surface of the pin head facilitate this contact, even if the panels are angled relative to each other. Therefore, even when the panels are placed on uneven ground, they are still able to lock with each other.

Figure 29:
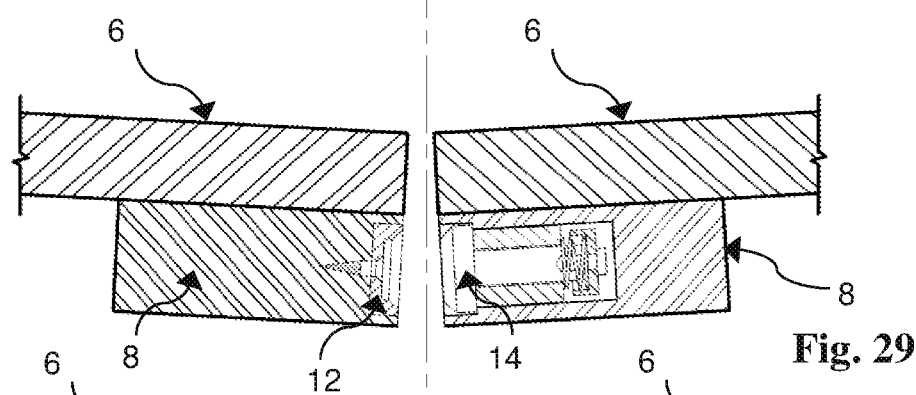
FIG. 29 is a cross-section view of an example embodiment of two panels angled downwards and spaced apart from each other, with the pin in a retracted position.
Figure 30:
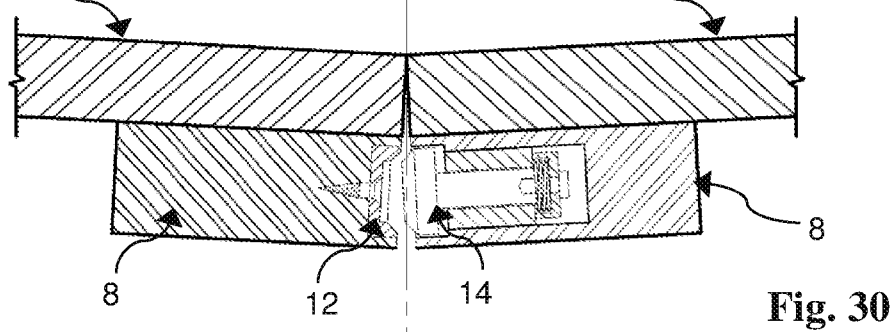
FIG. 30 is a cross-section view of the example embodiment shown in FIG. 29, but with the upper portion of the panels placed in contact with each other and with the pin in an extended position.

FIG. 29 and FIG. 30 show two panels 6 that are angled relative to each other, with the bottom of the pedestals 8 spaced angled away from each other and the top of the panels touching. Even in such an angled relationship, the magnetic force between the receptacle and the pin is able to help align and keep the panels together.

It can be appreciated that the pedestal 8 is not required, although it may be preferred to be used in raised flooring applications, for example. The self-locking mechanism can be embedded directly within a panel, with or without a pedestal.

Figure 31:
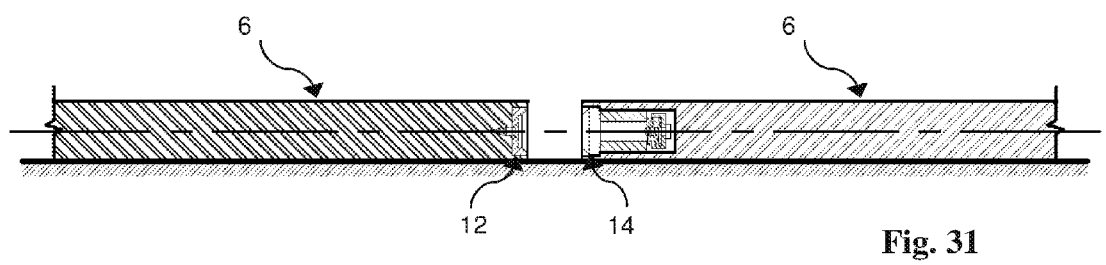
FIG. 31 is a cross-section view of an example embodiment of two panels having the self-locking mechanism embedded therein, the two panels spaced apart from each other and the pin in a retracted state.
Figure 32:
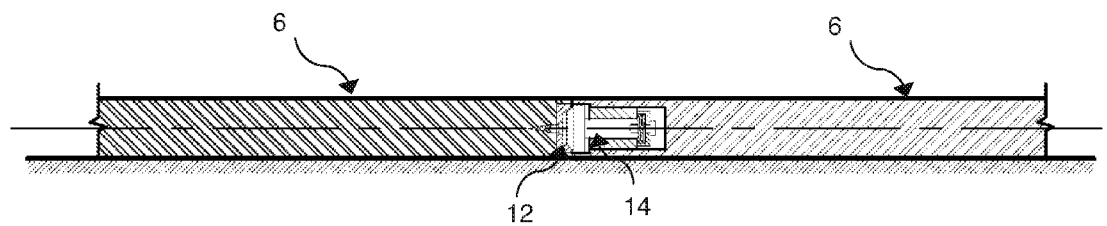
FIG. 32 is a cross-section view of the example embodiment shown in FIG. 31, but with the panels locked together and the pin in an extended state.

FIG. 31 shows two panels 6 that have a self-locking mechanism embedded therein and do not include pedestals. One panel has embedded therein a receptacle 12 and the other panel has embedded therein a pin 14 and corresponding mechanism. The panels 6 can be placed flush with a ground surface. FIG. 32 shows the pin 14 and the receptacle engaging each other.

The panels shown in FIGS. 31 and 32 can be used for flooring or wall paneling or other applications. It will be appreciated that the conveniences of joining two panels together, as described above with panels including pedestals, are also applicable to panels without pedestals.

Figure 33:
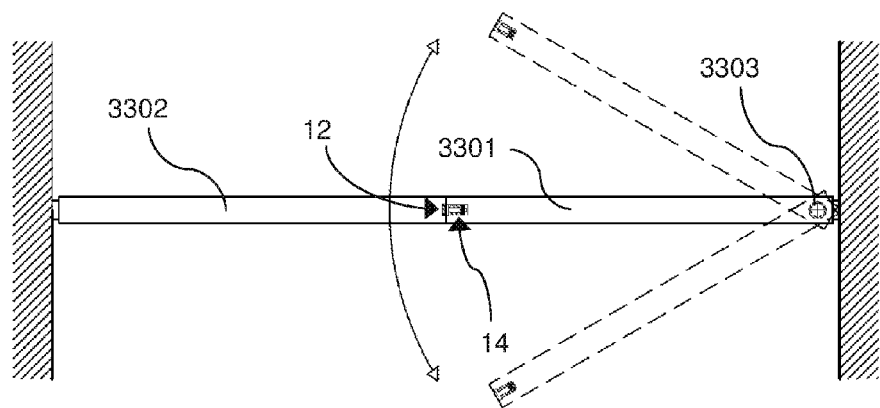
FIG. 33 is a cross-section plan view of an example embodiment of a door able to swing between open and closed positions, and the door including the self-locking mechanism.
Figure 34:
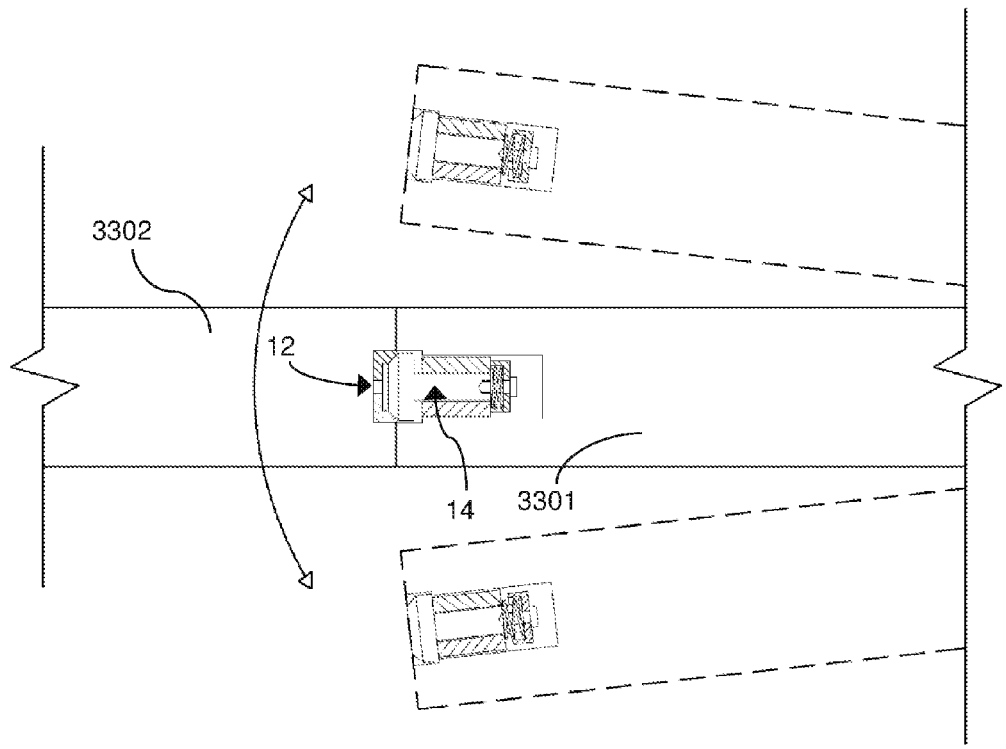
FIG. 34 is an expanded view of the example embodiment shown in FIG. 33, showing the pin being in an extended position when the door is closed and the pin being in an open position when the door is open.

The self-locking mechanism can also be used in a door. Turning to FIG. 33 and FIG. 34, a door 3301 is attached to a hinge 3303 that allows the door to rotate about the hinge. The door includes pin 14 that can extend and retract. Another structure 3302 includes the receptacle 12. When the door 3301 swings to an open position, the pin 14 is in a retracted state. In other words, when the door 3301 moves from a closed position to an open position, the pin 14 moves from the extended state to a retracted state. This allows the profile of the door to be flat, without protrusions, when the door is open. When the door 3301 swings to a closed position relative to the structure 3302, the pin 14 automatically extends using magnetic force and engages the receptacle 12. This causes the door 3301 to automatically lock in place relative to the structure 3302.

Figure 35:
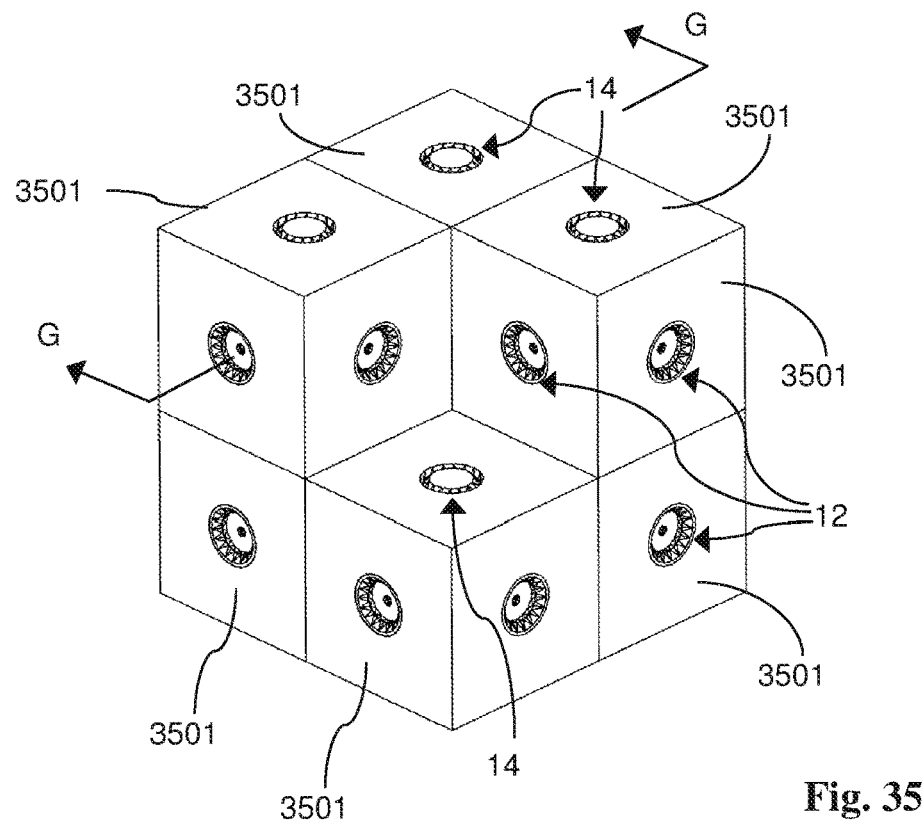
FIG. 35 is an example embodiment of blocks, each including a pin and a receptacle, and that are arranged to form a structure.
Figure 36:
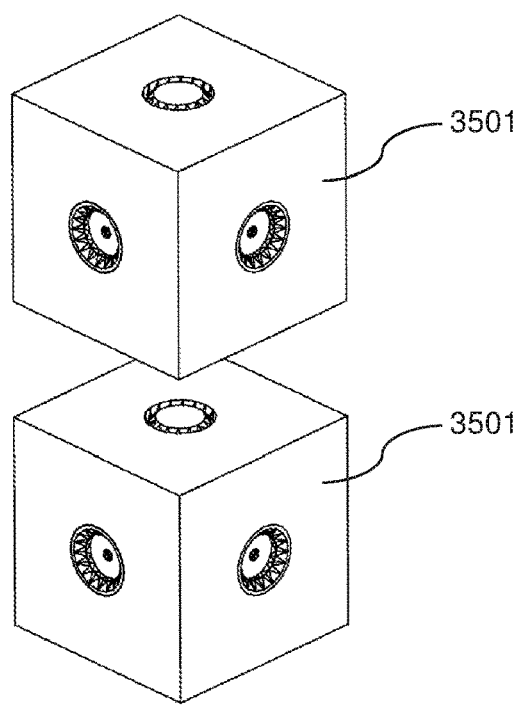
FIG. 36 is an example of the two of the blocks shown in FIG. 35, but shown spaced apart from each other.

The self-locking mechanism can also be used with other structures. For example, as shown in FIG. 35 and FIG. 36, blocks 3501 can include a receptacle 12 or a pin 14, or both. In the example shown in FIGS. 35 and 36, blocks 3501 can be locked together using the locking mechanism. Each block 3501 includes three receptacles 12 and three pins 14, which can interface with pins and receptacles of other blocks 3501. In this way, the blocks 3501 can be attached to each other on all sides and used to build different shapes of structures.

Figure 37:
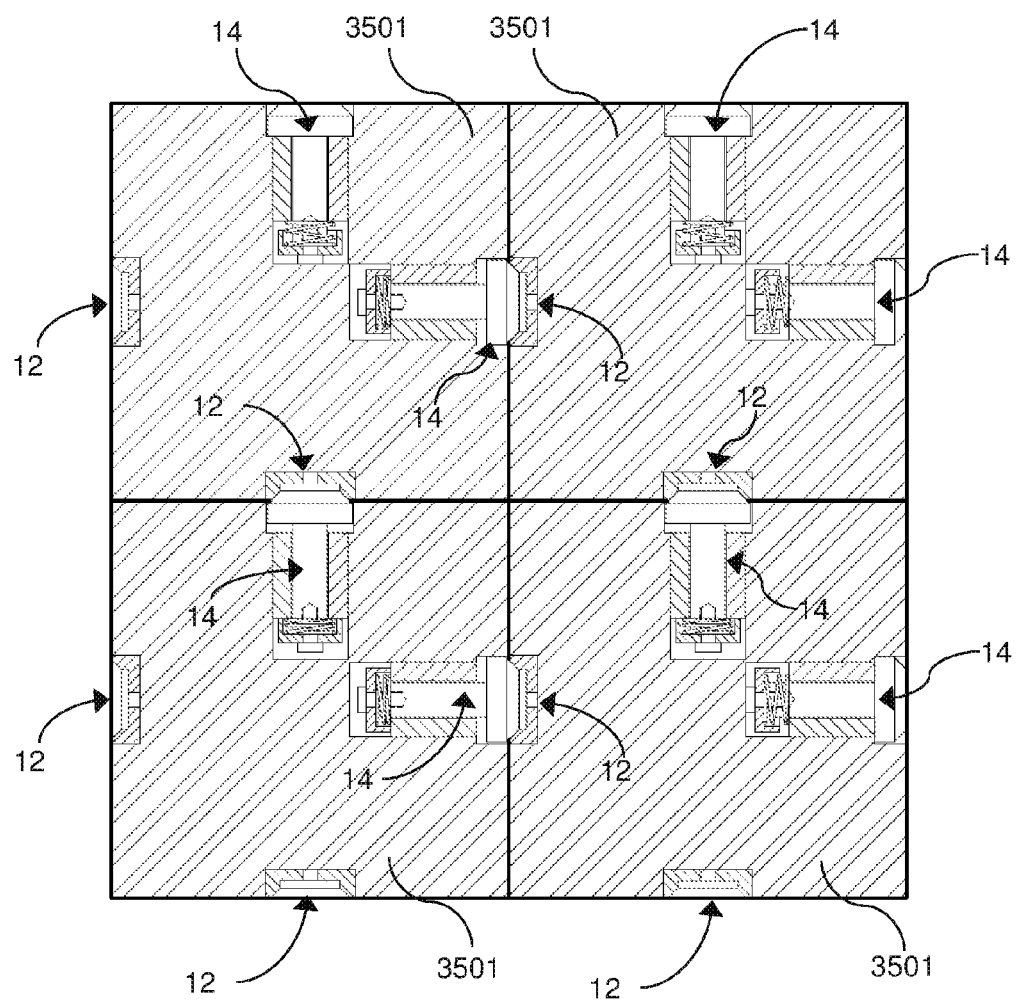
FIG. 37 is a cross-section view of the structure along cross-section line G-G in FIG. 35.

As shown in FIG. 37, a cross-section taken along line G-G from FIG. 35 shows the interconnection between multiple blocks 3501 and cross-section of the receptacles 12 and pins 14. Where a side of a block is adjacent to a side of another block, the block's pin is extended into the receptacle of the other block, or the block's receptacle is engaged with the pin extending from the other block.

It can be appreciated the locking mechanism can be combined with various shapes of structures, not limited to panels and blocks.

It can also be appreciated that different types of pin and receptacle mechanisms can be used according to the principles described herein.

Figure 38:
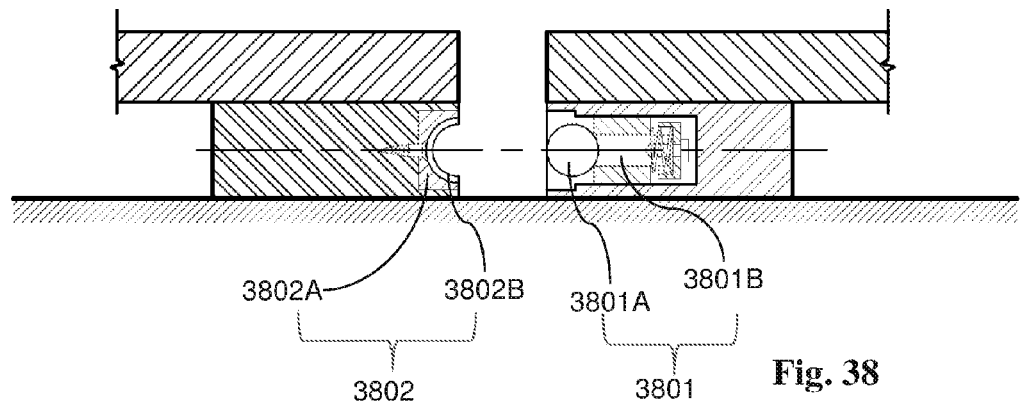
FIG. 38 is a cross-section view of another example embodiment of a self-locking mechanism including a rounded receptacle and a rounded pin head.

Turning to FIG. 38, a different example embodiment of a pin 3801 and a receptacle 3802 is shown. The pin 3801 includes a pin head 3801A and a shaft 3801B. The pin head 3801A is rounded. In a particular example embodiment, the pin head 3801A is spherical. The receptacle 3802 includes a casing 3802 and a magnet 3802B. The shape of the receptacle is rounded, and for example, defines part of a spherical void to receive the pin head 3801A. The magnet 3802B, for example, is shaped to define part of the spherical void.

Figure 39:
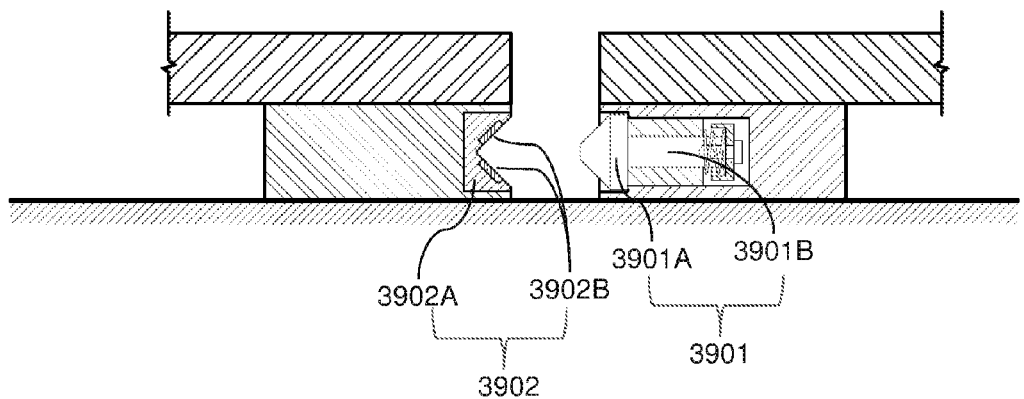
FIG. 39 is a cross-section view of another example embodiment of a self-locking mechanism including a wedge-shaped receptacle and a wedge-shaped pin head.

Turning to FIG. 39, another example embodiment of a pin 3901 and a receptacle 3902 is shown. The pin 3901 includes a pin head 3901A and a shaft 3901B. The pin head 3901A is shaped like a wedge. In a particular example embodiment, the pin head 3901A is shaped like a triangular prism, a square-based pyramid, or a triangular-based pyramid. The receptacle 3902 includes a casing 3902 and a magnet 3902B. The shape of the receptacle is angled, and for example, defines part of a wedge-shaped void to receive the pin head

3901A. The magnet 3902B, for example, is shaped to define part of a void shaped like a triangular prism, a square-based pyramid, or a triangular-based pyramid. There may be multiple magnet components in the receptacle 3902.

Figure 40:
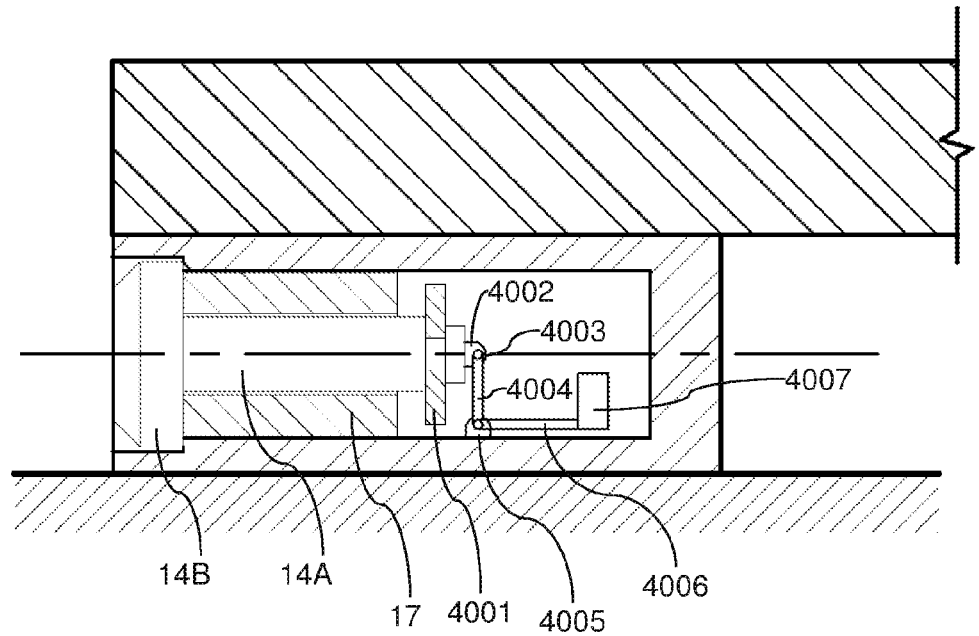
FIG. 40 is a cross-section view of another example embodiment of a pin mechanism used in a self-locking mechanism, the pin mechanism including a weighted arm and the pin shown in a retracted position.
Figure 41:
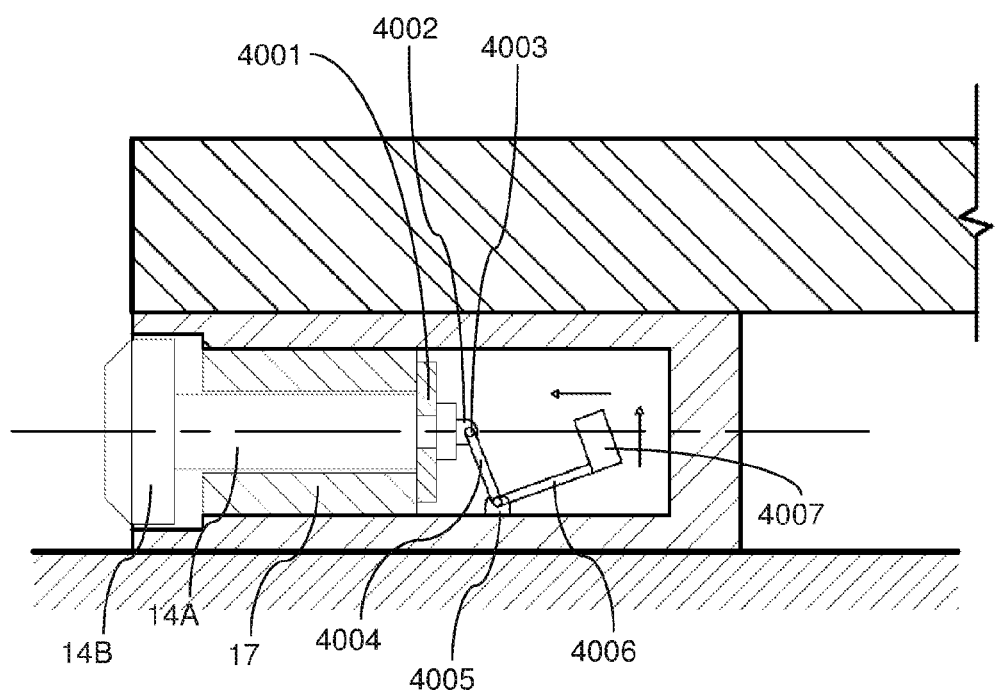
FIG. 41 is a cross-section view of the example embodiment shown in FIG. 40, but with the pin shown in an extended position.

Turning to FIG. 40 and FIG. 41, a pin mechanism is shown, which does not require a spring. In FIG. 40, the pin is shown in a retracted position, and in FIG. 41, the pin is shown in an extended position. It can be appreciated that the pin can automatically return to a retracted position, for example, in the absence of a sufficiently strong magnetic force.

As shown in FIG. 40, the end of the pin shaft 14A is connected to a stopper cap 4001. Protruding from the end of the stopper cap 4001 is a connection point 4002 that connects the stopper cap or pin shaft to a rigid arm 4004. The rigid arm 4004 is rigidly connected to another rigid arm 4006. Arms 4004 and 4006 may be formed of a unitary piece and may be configured to be approximately at a right angle to each other. The arms 4004 and 4006 can be a curved unitary piece. At one end of arm 4006, there may be a weight 4007.

Arm 4004 is connected to the connection point 4002 with a pivot 4003, so that arm 4004 can pivot when shaft 14A and thus the connection point 4002 moves forward or backward. Where arms 4004 and arms 4006 meet, both arms are configured to pivot about the connection point 4005. The connection point 4005 is fixed to a surface. In FIG. 49, when the pin is in a retracted position, the weight 4007 is in a downward position.

As shown in FIG. 41, when the pin moves to an extended position, for example because of a magnetic force, the connection point 4002 translates forward and the arms 4004 and 4006 rotate or pivot about connection point 4005. However, the arms 4004 and 4006 remain in the same relative position to each other. Therefore, as per FIG. 41, the weight 4007 is lifted upwards, against the force of gravity.

When the magnetic force is removed, the weight 4007 drops due to the force of gravity, causing the arm 4004 to pull the pin to a retracted state, as shown in FIG. 40.

Figure 42:
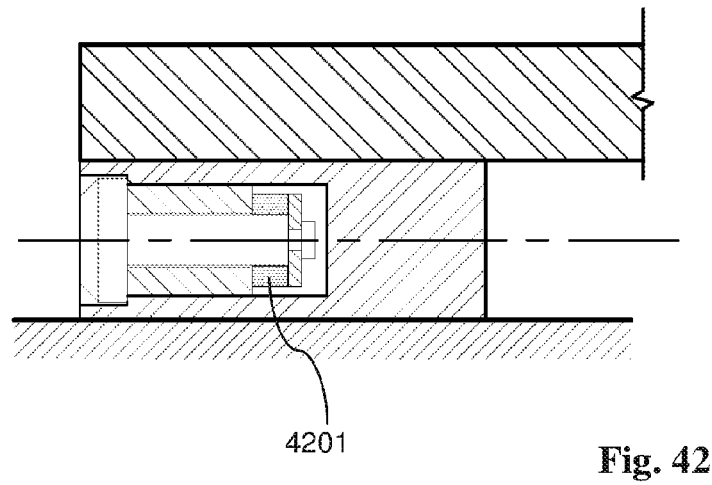
FIG. 42 is a cross-section view of another example embodiment of a pin mechanism used in a self-locking mechanism, the pin mechanism including a resiliently compressible material and the pin shown in a retracted position.

Turning to FIG. 42, another example embodiment of a pin mechanism is shown. Rather than using a coil spring, compression material 4201 is used to return the pin to a retracted state. The compression material is placed between the stopper and the bushing. The compression material can be made of foam, rubber, or some other resiliently deformable material. It can be appreciated that the pin shown in FIG. 42 is in a retracted state, and when the pin extends, for example, due to a magnetic force, the compression material 4201 will compress. When the magnetic force is removed, the compression material 4201 will resiliently decompress causing the pin to return to the retracted state.

Figure 43:
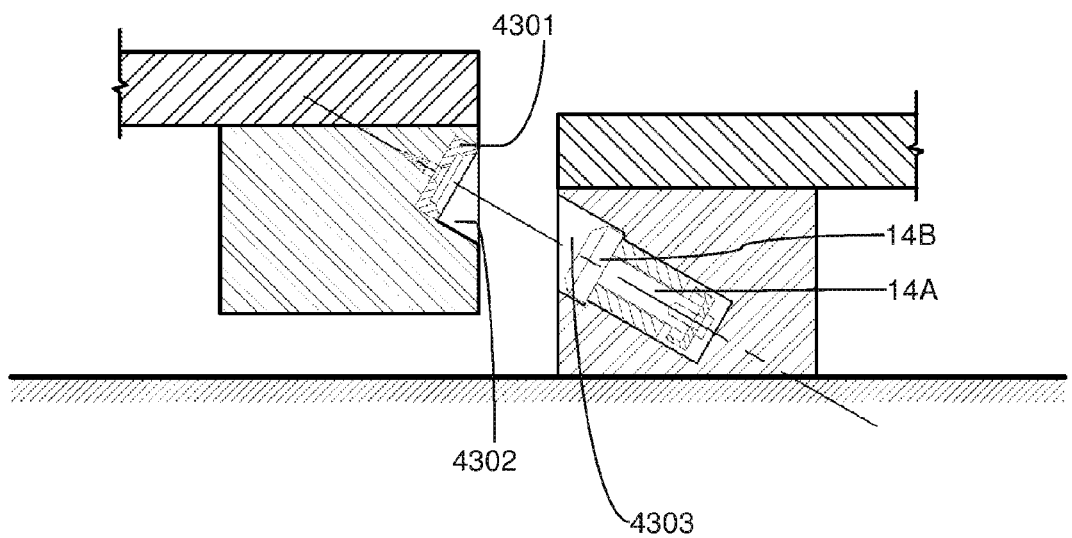
FIG. 43 is a cross-section view of another example embodiment of a self-locking mechanism, the self-locking mechanism including a pin mechanism positioned at an upward angle and a receptacle positioned at a matching downward angle, and the pin shown in a retracted state.

Turning to FIG. 43, another example embodiment of a pin mechanism and a corresponding receptacle 4301 is shown. The pin head 14B and pin shaft 14A are angled so that, when a magnetic force is presented, the pin head 14B and pin shaft 14A travel at an upward angle to an extended position. Otherwise, in the absence of a magnetic force, or sufficient magnetic force, the pin head 14B and the pin shaft 14A are weighed downwards to a retracted position, as shown in FIG. 43. A spring is not needed to return the pin to a retracted position since the gravitational force will pull the pin backwards. The space or void 4303 defined within the pedestal is therefore angled downwards from the opening. The corresponding receptacle 4301 is embedded at an angle matching the pin within a void 4302, where the void 4302 is angled upwards from the opening in another pedestal.

Figure 44:
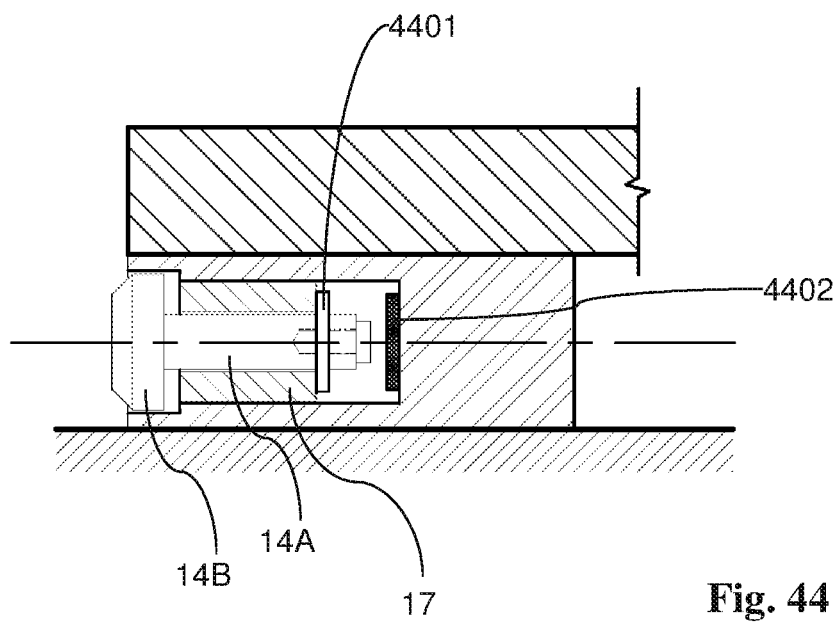
FIG. 44 is a cross-section view of another example embodiment of a pin mechanism used in a self-locking mechanism, the pin mechanism including a magnet and the pin shown in a retracted position.

Turning to FIG. 44, another example embodiment of a pin mechanism is shown that does not use a spring. Instead, a first magnetic force is used to keep the pin 14 in a retracted state. When a second magnetic force is presented to the pin 14, such as caused by the receptacle, the pin 14 moves to an extended position. The second magnetic force is stronger than the first magnetic force. In the example configuration shown in FIG. 44, the first magnetic force is caused by a magnet 4402 positioned behind the pin shaft 14A. The magnet 4402 pulls the pin back to a retracted position. In FIG. 44, the pin is shown in an extended position, and the extension is limited to the stopper cap 4401 contacting the bushing 17. It can be appreciated that the positioning of a magnet to create the first magnetic force can vary and is not limited to the position shown in FIG. 44.

Figure 45:
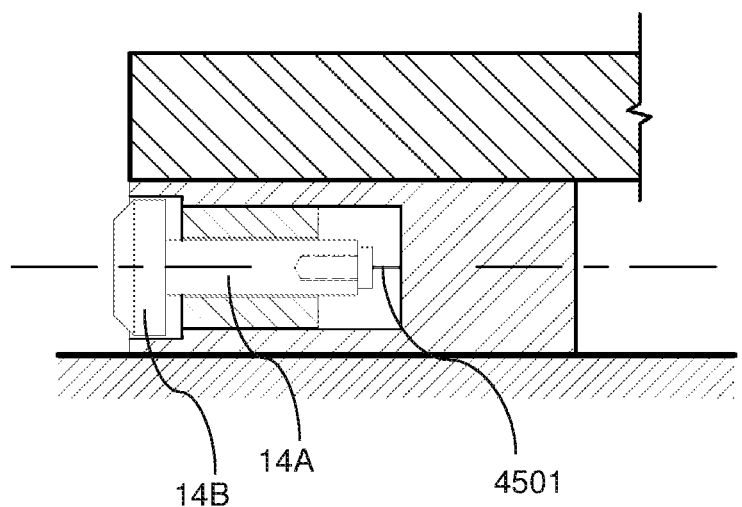
FIG. 45 is a cross-section view of another example embodiment of a pin mechanism used in a self-locking mechanism, the pin mechanism including an elastic band and the pin shown in a retracted position.

Turning to FIG. 45, an elastic 4501 is used to pull the pin shaft 14A back to a retracted position. One end of the elastic 4501 is attached to the end of the pin shaft 14A and the other end of the elastic 4501 is attached to a stationary structure. The pin 14 is shown in the extended position in FIG. 45. It can be appreciated that a stopper cap is not required in this example embodiment, because the elastic 4501 restricts the distance of which the pin can extend.

Turning to FIGS. 46 to 49 another example embodiment of a pin mechanism is shown, which includes a resiliently deformable bumper 4601 positioned between the stopper cap 19 and the bushing 17. The bumper 4601 allows for the pin 14 to extend to a further extended position.

In particular, the bumper 4601 is able to resiliently compress under a force, and when the force is removed, the bumper is able to decompress back to its initial shape. The bumper 4601 can be made of rubber, foam, or a synthetic material. The bumper 4601 may include a mechanism with an air pocket. In general, materials or configurations that facilitate the bumper being able to compress and return to its initial shape again can be used. The bumper 4601 is configured to be compressed by the magnetic force exerted between the pin and the receptacle.

In FIG. 46, a bumper pad 4602 is also shown and it is located on the surface of the bumper 4601. When the stopper cap exerts a pushing force against the bumper pad 4602, the bumper pad 4602 distributes the pushing force across the surface of the bumper 4601. This causes the bumper 4601 to compress in a more even manner. It can be appreciated, however, that other example embodiments do not have a bumper pad 4602.

In operation, when a pin mechanism and a receptacle are aligned with each other, and not angled toward each other, the following occurs: the pin would extend to a first distance to contact the receptacle; and the spring 18 is compressed and the bumper 4601 is not compressed, or the spring 18 and the bumper 4601 are both partially compressed, or the bumper 4601 is compressed and the spring 18 is not compressed. This is shown in FIG. 47. In particular, in FIG. 47, the spring 18 and the bumper 4601 are both partially compressed When a pin mechanism and a receptacle are not aligned with each other and, for example, are angled toward each other, or when the pin mechanism and the receptacle are spaced apart from each other, the following occurs: the pin would extend to a second distance towards the receptacle; and the spring 18 is compressed and the bumper 4601 is compressed. The second distance is further than the first distance. This further extended position is shown in FIG. 49. In this second scenario, it is assumed that the magnetic force is able to act on the pin, even if the pin and receptacle are not aligned or are spaced apart from each other. In this second scenario, the pin may be able to contact the receptacle or at least strengthen the magnetic force interacting between the pin and the receptacle because the pin has extended further. This is especially useful, for example, when the panels are placed on uneven surfaces, causing the pin and receptacle to be angled to each other.

The resiliently deformable bumper 4601 can also be used in combination with other example embodiments described herein, including, but not limited to those embodiments shown in FIGS. 25, 26, and 40-44.

Figure 50:
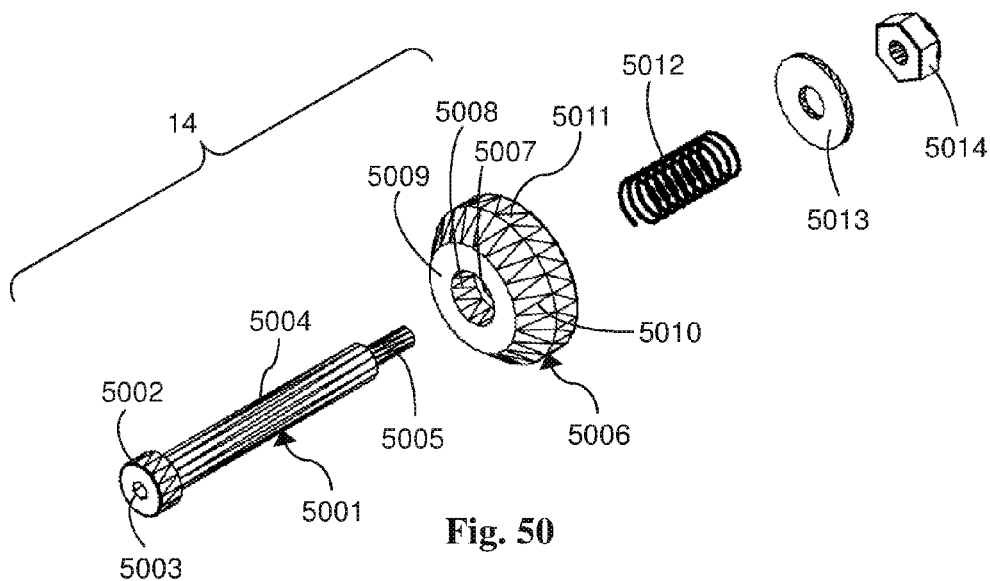
FIG. 50 is an exploded perspective view of another example of a pin mechanism used in a self-locking mechanism.
Figure 51:
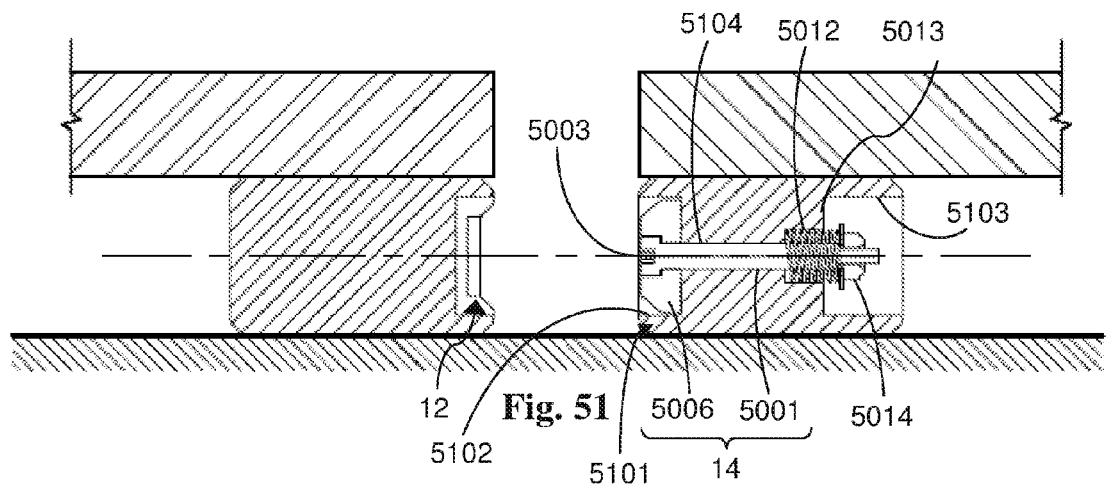
FIG. 51 is a cross-section view of an example embodiment of two panels spaced apart from each other, one of the panels including the pin mechanism of FIG. 50.
Figure 52:
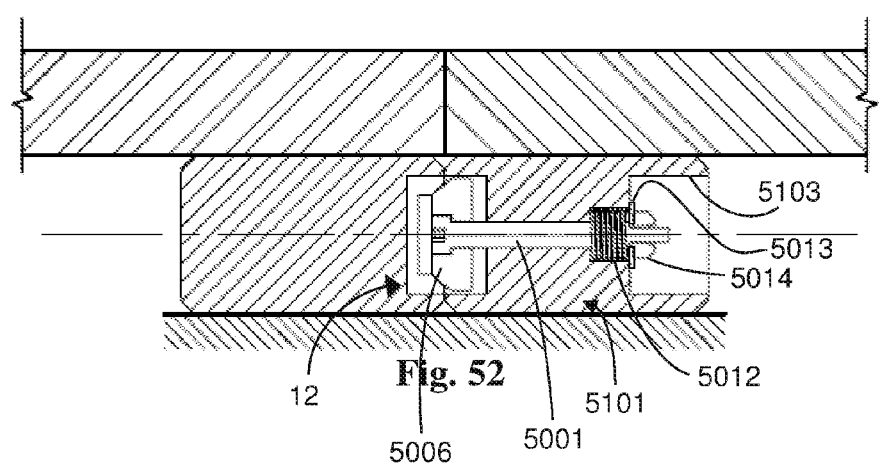
FIG. 52 is a cross-section view of the example embodiment shown in FIG. 51, but with the two panels positioned together and the pin mechanism in an extended position.

Turning to FIG. 50, another example embodiment of a pin mechanism is shown in an exploded view. The assembled pin mechanism is shown in FIGS. 51 and 52. The pin 14 includes a bolt 5001 and a pin head 5006. The pin head 5006 defines a cylindrical void to accommodate the bolt 5001.

The bolt 5001 includes a bolt head 5002, a primary portion of a bolt body 5004 and a secondary portion of the bolt body 5005. The bolt head 5002 has a wider circumference compared to the primary portion 5004. The secondary portion 5005 may have a smaller circumference compared to the primary portion 5004, although not necessarily. The surface of the primary portion 5004 is smooth to allow the pin mechanism to move easily between a retracted position and an extended position. The surface of the secondary portion 5005 is threaded to allow a nut 5014 to be secured to the end of the bolt 5001. The head of the bolt 5002 includes a slot or depression 5003 shaped to receive a tool bit. For example, the slot or depression is square shaped, hexagonal shaped, cruciform shaped, shaped as a single slot, etc. to receive a tool bit driver. Other shapes can be used.

The exterior of the pin head 5006 includes a facing surface 5009, a tapered surface 2010, and a side surface 5011. The pin head 5006 also includes interior surfaces that define a void for receiving the bolt 5001. The interior surfaces include a cylindrical surface 5008 and a shoulder surface 5007 that abuts against the bolt head 5002. It will be appreciated that the pin head 5006 can have different shapes other than the pin head described here (e.g. rounded, cylindrical, multi-faceted, etc.).

In assembly, as best seen in FIG. 51, the bolt 5001 is passed through the void of the pin head 5010, and then the primary and the secondary portions 5004 and 5005 are passed through a channel 5104 defined within a structure 5101. For example, the structure is part of pedestal or paneling system, or some other object. The structure 5101 includes an opening 5102 at one end of the channel 5104 and another opening 5103 at the opposite end of the channel 5104. The opening 5102 is sized to receive the pin head 5006. The other opening 5103 is sized to allow access to the nut 5014 positioned on the secondary portion of the bolt 5005.

In particular, during the assembly, after the bolt is placed through the channel 5104, a coil spring 5012 and a washer are placed around the end of the bolt. Then, a nut 5014 is secured to the second portion 5005 to hold the washer and coil in place.

In an example embodiment, the pin mechanism shown in FIGS. 50, 51 and 52 is easy to assemble. A person can apply a force to the bolt 5001 using a tool inserted into the depression 5003 and apply a counter-force to the nut 5014 using another tool to secure the nut 5014 to the secondary portion 5005 of the bolt 5001. A twisting or torque force is applied to secure the nut 5014. A person can access both ends of the bolt 5001 through the openings 5102 and 5103.

The example shown in FIGS. 50, 51 and 52 uses more commonly available components and, thus, is cheaper to manufacture.

In another example embodiment, the pin head 5006 is able to rotate relative to the bolt 5001. This provides more flexibility of the relative angle between two structures that are being locked together using the self-locking mechanism.

Figure 53:
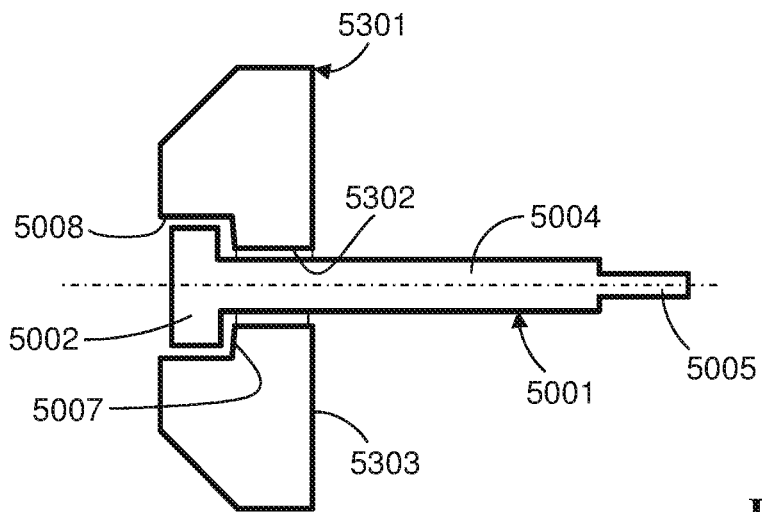
FIG. 53 is a cross-section view of an example embodiment of a bolt and a pin head of the pin mechanism, shown in isolation.

For example, in FIG. 53, the bolt 5001 is shown nestled in the pin head 5301. The pin head includes an interior side wall 5008 and a shoulder surface 5007 to hold the bolt head 5002. Extending from the shoulder 5007 to the back surface 5303 of the pin head 5301 is another interior side wall 5302 which is dimensioned to allow the primary portion 5004 of the bolt to pass through, but not the bolt head 5002.

Figure 54:
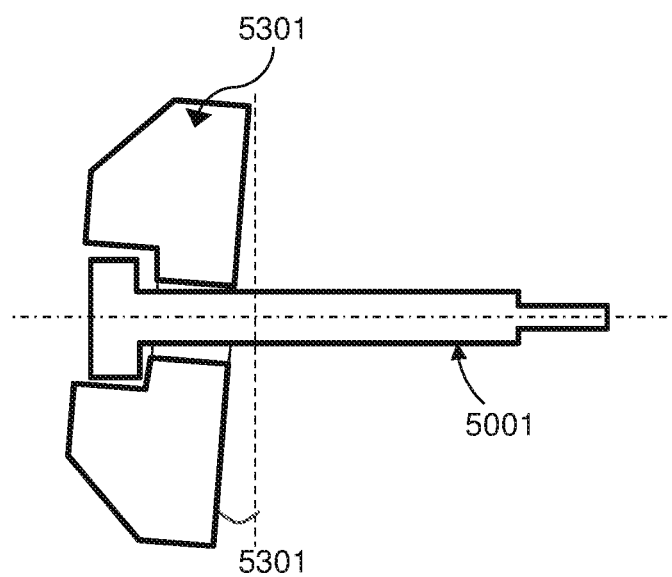
FIG. 54 and FIG. 55 are cross-section views of the example embodiment shown in FIG. 53, with the pin head rotated relative to the bolt in different orientations.
Figure 55:
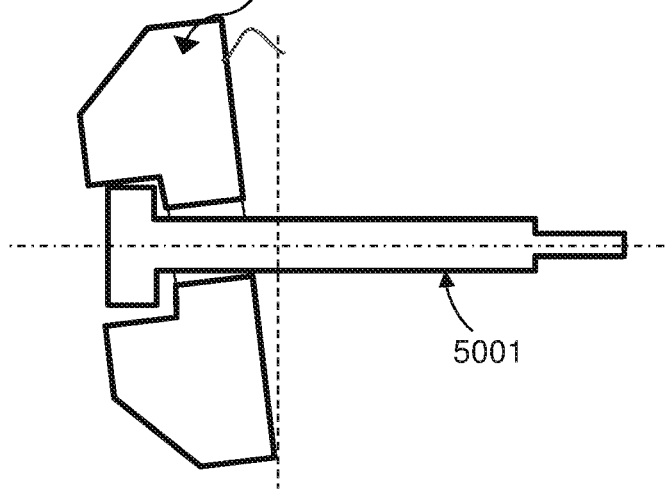

The interior side wall 5302 defines a channel within the pin head 5301. In the example embodiment of FIG. 53, the channel is sized to allow space between the surface of the interior side wall 5302 and the surface of the primary portion 5004 of the bolt. This allows the pin head 5301 to be angled relative to the bolt 5001. Different angles or orientations of the pin head 5301 relative to the bolt 5001 are shown in FIG. 54 and FIG. 55.

The ability for the pin head 5301 to have different angles allows for two adjoining structures to be angled relative to each other, while still forming a self-locking connection. For example, panels on uneven floors may more easily form a secure self-locking connection to each other. In particular, although the bolt 5001 of a first structure, which holds the pin mechanism 14, is angled relative to the receptacle 12, located in a second structure, the pin head 5301 is able to rotate relative to the bolt to compensate for the angle difference. Therefore, the pin head 5301 is able to be flush with the receptacle 12 in the locked position, or is able to have more surface area of the pin head 5301 to be in contact with the receptacle 12. This increases the mechanical and magnetic locking force.

Various features described herein from different example embodiments can be combined together, although such combinations have not been explicitly described. For example, the different pin mechanisms used to retract the pin can be used with the door structure.

In a general example embodiment, a self-locking paneling system includes: a panel defining a void therein and a pin positioned within the void; another structure configured to connect with the panel, the other structure comprising a receptacle; a magnet positioned on at least one of the receptacle and the pin; and wherein, when the panel and the other structure are positioned together, the pin is configured to move from a retracted position from within the void to an extended position to engage the receptacle using magnetic force produced by the magnet.

In an example aspect, the panel is a raised floor panel. In another example aspect, the raised floor panel comprises a pedestal, and wherein the void and the pin are positioned within the pedestal. In another example aspect, the pin is configured to move back to the retracted position in the absence of the magnetic force.

In another general example embodiment, a kit of parts that, when assembled, forms a self-locking panel. The kit of parts includes: a pedestal defining a void therein and a pin positioned within the void; a panel configured to be attached to the pedestal; another pedestal comprising a receptacle; another panel configured to be attached to the other pedestal; and wherein at least one of the pin and the receptacle are magnetic and, when the panel and the other structure are positioned together, the pin is configured to move from a retracted position from within the void to an extended position to engage the receptacle using magnetic force.

In another general example embodiment, a self-locking mechanism includes: a structure defining a void therein and a pin positioned within the void; the structure configured to permit longitudinal movement of the pin back and forth within the void; the pin comprising a material that at least reacts to a magnetic force or exerts the magnetic force; and wherein the pin is configured to move from a retracted position from within the void to an extended position using magnetic force.

It will be appreciated that the particular example embodiments shown in the figures and described above are for illustrative purposes only and many other variations can be used according to the example embodiments described herein. Although the above has been described with reference to specific example embodiments, various modifications thereof will be apparent to those skilled in the art as outlined in the appended claims.

The invention claimed is:

1. A self-locking mechanism attachable to a panel, the self-locking mechanism comprising:
    a structure defining a void therein, an end of the void positioned at an opening in the structure;
    a pin positioned within the void and a pin head of the pin positioned at the opening;
    the structure configured to permit longitudinal movement of the pin back and forth within the void;
    the pin is configured to move between a retracted position from within the void and an extended position;
    the pin is biased to the retracted position with a constantly exerted biasing force;
    a receptacle positioned on the structure and oriented at an angle to the opening; and
    at least one of the pin head and the receptacle comprises a magnet; and
    wherein the pin head is able to move from the retracted position to the extended position and magnetically connect with an ancillary receptacle from an ancillary self-locking mechanism using a magnetic pulling force that is greater than the constantly exerted biasing force.

2. The self-locking mechanism of claim 1 further comprising a resilient member that constantly exerts the biasing force to bias the pin to maintain or return to the retracted position.

3. The self-locking mechanism of claim 2 wherein the resilient member is a spring.

4. The self-locking mechanism of claim 1 wherein the receptacle comprises the magnet.

5. The self-locking mechanism of claim 1 wherein the pin head comprises the magnet.

6. The self-locking mechanism of claim 1 wherein the opening is positioned on a first surface of the structure and the receptacle is positioned on a second surface of the structure, and the first surface and the second surface are substantially perpendicular to each other.

7. The self-locking mechanism of claim 1 further comprising a movable weighted mechanism that constantly exerts the biasing force to bias the pin to maintain or return to the retracted position.

8. The self-locking mechanism of claim 1 wherein the void, the pin and the pin head are oriented at an angle; the pin and the pin head travel at an upward angle to move from the retracted position to the extended position; and a gravitational force is the constantly exerted biasing force to bias the pin to maintain or return to the retracted position.

9. A kit of parts comprising at least a first self-locking mechanism and a second self-locking mechanism, each one of the self-locking mechanisms attachable to a panel and each one of the self-locking mechanisms comprising:
    a structure defining a void therein, an end of the void positioned at an opening in the structure; a pin positioned within the void and a pin head of the pin positioned at the opening; the structure configured to permit longitudinal movement of the pin back and forth within the void; the pin is configured to move between a retracted position from within the void and an extended position; the pin is biased to the retracted position with a constantly exerted biasing force; a receptacle positioned on the structure and oriented at an angle to the opening; and at least one of the pin head and the receptacle comprises a magnet; and,
    wherein the pin head of the first self-locking mechanism is able to move from the retracted position to the extended position and magnetically connect with the receptacle from a second self-locking mechanism using a magnetic pulling force that is greater than the constantly exerted biasing force.

10. The kit of parts of claim 9 further comprising a first panel and a second panel, the first panel and the first self-locking mechanism attachable to each other, and the second panel and the second self-locking mechanism attachable to each other.

11. The kit of parts of claim 9 wherein each one of the self-locking mechanisms further comprises a resilient member that constantly exerts the biasing force to bias the pin to maintain or return to the retracted position.

12. The kit of parts of claim 11 wherein, for each one of the self-locking mechanisms, the resilient member is a spring.

13. The kit of parts of claim 9 wherein, for each one of the self-locking mechanisms, the receptacle comprises the magnet.

14. The kit of parts of claim 9 wherein, for each one of the self-locking mechanisms, the pin head comprises the magnet.

15. The kit of parts of claim 9 wherein, for each one of the self-locking mechanisms, the opening is positioned on a first surface of the structure and the receptacle is positioned on a second surface of the structure, and the first surface and the second surface are substantially perpendicular to each other.

16. The kit of parts of claim 9, wherein each one of the self-locking mechanisms further comprising a movable weighted mechanism that constantly exerts the biasing force to bias the pin to maintain or return to the retracted position.

17. The kit of parts of claim 9, wherein for each one of the self-locking mechanisms, the void, the pin and the pin head are oriented at an angle; the pin and the pin head travel at an upward angle to move from the retracted position to the extended position; and a gravitational force is the constantly exerted biasing force to bias the pin to maintain or return to the retracted position.

* * * * *